US012031817B2

(12) United States Patent
Shaga

(10) Patent No.: US 12,031,817 B2
(45) Date of Patent: Jul. 9, 2024

(54) INDUCTIVE ANGULAR-POSITION SENSORS, AND RELATED DEVICES, SYSTEMS, AND METHODS

(71) Applicant: Microchip Technology Incorporated, Chandler, AZ (US)

(72) Inventor: Ganesh Shaga, Telangana (IN)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 17/808,600

(22) Filed: Jun. 24, 2022

(65) Prior Publication Data

US 2023/0045209 A1 Feb. 9, 2023

(30) Foreign Application Priority Data

Aug. 5, 2021 (IN) .............................. 202141035344

(51) Int. Cl.
*G01B 7/30* (2006.01)
*G01D 5/20* (2006.01)

(52) U.S. Cl.
CPC .............. *G01B 7/30* (2013.01); *G01D 5/20* (2013.01)

(58) Field of Classification Search
CPC .......... G01B 7/30; G01D 5/20; G01D 5/2046
See application file for complete search history.

(56) References Cited

U.S. PATENT DOCUMENTS

| 1,639,044 A | 8/1927 | Mansbridge |
| 3,197,763 A | 7/1965 | Fisher |
| 3,281,826 A | 10/1966 | Moffitt |
| 4,223,300 A | 9/1980 | Wiklund |

(Continued)

FOREIGN PATENT DOCUMENTS

| CN | 108351224 A | 7/2018 |
| CN | 112272755 A | 1/2021 |

(Continued)

OTHER PUBLICATIONS

"A Revolution in Sensing: World's First Inductance-to-Digital Converter", LDC1000 Inductive Sensing Brochure, Texas Instruments, 2013, pp. 1-6, Almaden Press, San Jose, CA.

(Continued)

*Primary Examiner* — Akm Zakaria
(74) *Attorney, Agent, or Firm* — TraskBritt

(57) ABSTRACT

Examples disclosed herein relate generally to inductive angular-position sensors. An example apparatus may include a support structure, a first inductive angular-position sensor, a second inductive angular-position sensor, and a shield. The first inductive angular-position sensor may include a respective first sense coil arranged at a first portion of the support structure. The respective first sense coil may at least partially circumscribe an axis. The second inductive angular-position sensor may include a respective first sense coil arranged opposite the first sense coil of the first inductive angular-position sensor at a second portion of the support structure. The first sense coil of the first inductive angular-position sensor may at least partially circumscribe the axis. The shield may be arranged between the first sense coil of the first inductive angular-position sensor and the first sense coil of the second inductive angular-position sensor.

25 Claims, 11 Drawing Sheets

(56) References Cited

U.S. PATENT DOCUMENTS

| | | | |
|---|---|---|---|
| 4,356,732 A | 11/1982 | Hachtel et al. | |
| 4,737,698 A | 4/1988 | McMullin et al. | |
| 4,847,548 A | 7/1989 | Lafler | |
| 4,853,604 A | 8/1989 | McMullin et al. | |
| 5,061,896 A | 10/1991 | Schmidt | |
| 5,239,288 A | 8/1993 | Tsals | |
| 6,111,402 A | 8/2000 | Fischer | |
| 6,236,199 B1 | 5/2001 | Irle et al. | |
| 6,239,571 B1 | 5/2001 | Shimahara | |
| 6,255,810 B1 | 7/2001 | Irle et al. | |
| 6,304,014 B1 | 10/2001 | England et al. | |
| 6,304,076 B1 | 10/2001 | Madni et al. | |
| 6,384,598 B1 | 5/2002 | Hobein et al. | |
| 6,483,295 B2 | 11/2002 | Irle et al. | |
| 6,522,128 B1 | 2/2003 | Ely et al. | |
| 6,591,217 B1 | 7/2003 | Baur et al. | |
| 6,593,730 B2 | 7/2003 | Zapf | |
| 6,605,940 B1 | 8/2003 | Tabrizi et al. | |
| 7,276,897 B2 | 10/2007 | Lee | |
| 7,385,389 B2 | 6/2008 | Tahara et al. | |
| 7,719,264 B2 | 5/2010 | Tiemann | |
| 7,726,208 B2 | 6/2010 | Hoeller et al. | |
| 7,821,256 B2 | 10/2010 | Lee | |
| 7,906,960 B2 | 3/2011 | Lee | |
| 8,278,911 B2 | 10/2012 | Tiemann et al. | |
| 8,339,126 B2 | 12/2012 | Izak et al. | |
| 8,345,438 B2 | 1/2013 | Mi et al. | |
| 8,451,000 B2 | 5/2013 | Tiemann | |
| 8,482,894 B2 | 7/2013 | Yra et al. | |
| 8,508,242 B2 | 8/2013 | Shao et al. | |
| 8,618,791 B2 | 12/2013 | Grinberg et al. | |
| 8,928,310 B2 | 1/2015 | Ocket et al. | |
| 8,947,077 B2 | 2/2015 | Lee et al. | |
| 8,988,066 B2 | 3/2015 | Shao et al. | |
| 9,234,771 B2 | 1/2016 | Sasaki | |
| 9,300,022 B2 | 3/2016 | Vaisman | |
| 9,322,636 B2 | 4/2016 | Fontanet | |
| 9,528,858 B2 | 12/2016 | Bertin | |
| 9,677,913 B2 | 6/2017 | Wang et al. | |
| 9,929,651 B2 | 3/2018 | Cannankurichi et al. | |
| 10,415,952 B2 | 9/2019 | Reddy et al. | |
| 10,760,928 B1 | 9/2020 | Shaga et al. | |
| 10,761,549 B2 | 9/2020 | Sasmal et al. | |
| 10,837,847 B2 | 11/2020 | Smith, Jr. | |
| 10,884,037 B2 | 1/2021 | Chellamuthu et al. | |
| 10,921,155 B2 | 2/2021 | Shaga et al. | |
| 11,313,702 B2 | 4/2022 | Le Goff et al. | |
| 11,525,701 B2 | 12/2022 | Lugani et al. | |
| 11,525,716 B2 | 12/2022 | El-Shennawy et al. | |
| 11,656,101 B2 | 5/2023 | Shaga | |
| 2001/0001430 A1 | 5/2001 | Ely et al. | |
| 2002/0000129 A1 | 1/2002 | Madni et al. | |
| 2002/0097042 A1 | 7/2002 | Kawate et al. | |
| 2002/0196015 A1* | 12/2002 | Zapf | G01D 5/2275 |
| | | | 324/207.17 |
| 2003/0062889 A1 | 4/2003 | Ely et al. | |
| 2003/0067941 A1 | 4/2003 | Fall | |
| 2003/0206007 A1 | 11/2003 | Gass et al. | |
| 2004/0065533 A1 | 4/2004 | Schwesig et al. | |
| 2004/0080313 A1 | 4/2004 | Brosh | |
| 2004/0081313 A1 | 4/2004 | McKnight et al. | |
| 2004/0182602 A1 | 9/2004 | Satoh et al. | |
| 2006/0038635 A1 | 2/2006 | Richiuso et al. | |
| 2006/0119351 A1 | 6/2006 | James et al. | |
| 2006/0125472 A1 | 6/2006 | Howard et al. | |
| 2007/0001666 A1 | 1/2007 | Lee | |
| 2008/0054887 A1 | 3/2008 | Lee | |
| 2008/0164869 A1 | 7/2008 | Bach et al. | |
| 2008/0174302 A1 | 7/2008 | Lee et al. | |
| 2008/0176530 A1 | 7/2008 | Kuhn et al. | |
| 2008/0238416 A1 | 10/2008 | Shiraga et al. | |
| 2009/0079422 A1 | 3/2009 | Lee | |
| 2010/0271012 A1 | 10/2010 | Patterson et al. | |
| 2011/0101968 A1 | 5/2011 | Brands et al. | |
| 2012/0081106 A1 | 4/2012 | Grinberg et al. | |
| 2012/0175198 A1 | 7/2012 | Thibault et al. | |
| 2012/0242352 A1 | 9/2012 | Gong et al. | |
| 2012/0244802 A1 | 9/2012 | Feng et al. | |
| 2013/0021023 A1* | 1/2013 | Niwa | G01B 7/30 |
| | | | 324/207.15 |
| 2013/0257417 A1 | 10/2013 | Ely | |
| 2013/0289826 A1 | 10/2013 | Yoshitake et al. | |
| 2015/0233695 A1* | 8/2015 | Gomes | G01D 5/2086 |
| | | | 324/207.17 |
| 2015/0323349 A1 | 11/2015 | Has et al. | |
| 2016/0099301 A1 | 4/2016 | Yen et al. | |
| 2016/0214648 A1 | 7/2016 | Schoepe et al. | |
| 2017/0158231 A1 | 6/2017 | Farrelly | |
| 2017/0166251 A1 | 6/2017 | Shao et al. | |
| 2018/0040413 A1 | 2/2018 | Yen et al. | |
| 2018/0224301 A1 | 8/2018 | Herrmann et al. | |
| 2018/0274591 A1 | 9/2018 | Maniouloux et al. | |
| 2018/0274948 A1 | 9/2018 | Maniouloux et al. | |
| 2019/0009903 A1 | 1/2019 | Chan et al. | |
| 2019/0017845 A1 | 1/2019 | Utermoehlen et al. | |
| 2019/0025088 A1 | 1/2019 | Utermoehlen et al. | |
| 2019/0063956 A1 | 2/2019 | Bertin | |
| 2019/0094047 A1 | 3/2019 | Utermoehlen et al. | |
| 2019/0186891 A1 | 6/2019 | Utermoehlen et al. | |
| 2019/0195963 A1 | 6/2019 | Qama | |
| 2019/0226828 A1 | 7/2019 | Lugani et al. | |
| 2019/0242725 A1 | 8/2019 | Shaga et al. | |
| 2019/0326501 A1 | 10/2019 | Gilbert et al. | |
| 2019/0331541 A1 | 10/2019 | Janisch et al. | |
| 2019/0360839 A1 | 11/2019 | Shao | |
| 2020/0088549 A1 | 3/2020 | Shao | |
| 2020/0200569 A1 | 6/2020 | Utermoehlen et al. | |
| 2021/0063206 A1* | 3/2021 | Ausserlechner | G01B 7/30 |
| 2021/0080243 A1 | 3/2021 | Ocket et al. | |
| 2021/0098187 A1 | 4/2021 | Kumar et al. | |
| 2021/0226877 A1 | 7/2021 | Tamasi et al. | |
| 2021/0255657 A1 | 8/2021 | Miller et al. | |
| 2021/0372823 A1 | 12/2021 | Witts et al. | |
| 2022/0011138 A1 | 1/2022 | Shaga et al. | |
| 2022/0155050 A1 | 5/2022 | Gillet et al. | |
| 2022/0307868 A1 | 9/2022 | Shaga et al. | |
| 2023/0175869 A1* | 6/2023 | Goldman | G01D 5/48 |
| | | | 324/207.18 |

FOREIGN PATENT DOCUMENTS

| | | |
|---|---|---|
| CN | 112484621 A | 3/2021 |
| DE | 4021637 A1 | 1/1992 |
| DE | 10120822 A1 | 4/2002 |
| DE | 102015220615 A1 | 4/2017 |
| DE | 102019207070 A1 | 11/2020 |
| EP | 0467514 A2 | 1/1992 |
| EP | 1078226 B1 | 10/2003 |
| EP | 1914520 A2 | 4/2008 |
| EP | 2145158 A2 | 1/2010 |
| EP | 2044389 B1 | 4/2010 |
| EP | 3865825 A1 | 8/2021 |
| FR | 2304900 A1 | 10/1976 |
| GB | 1502697 A | 3/1978 |
| GB | 2394293 A | 4/2004 |
| JP | 3839449 B2 | 11/2006 |
| JP | 2021-025851 A | 2/2021 |
| WO | 2008/125853 A1 | 10/2008 |
| WO | 2008/139216 A2 | 11/2008 |
| WO | 2016/079465 A1 | 5/2016 |
| WO | 2017/100515 A1 | 6/2017 |
| WO | 2018/108783 A2 | 6/2018 |
| WO | 2019/152092 A1 | 8/2019 |
| WO | 2021/239175 A1 | 12/2021 |

OTHER PUBLICATIONS

"Inductive Sensor Coil Design Using LX3301A", AN-S1412 Application Note, Microsemi Corporate Headquarters, One Enterprise, Aliso Viejo, CA 92656 USA, Nov. 2017.

Song et al., "Simulations of Nonuniform Behaviors of Multiple No-Insulation (RE)Ba2Cu3O7-x HTS Pancake Coils During Charg-

(56) References Cited

OTHER PUBLICATIONS ing and Discharging", IEEE Transactions on Applied Superconductivity, vol. 26, No. 4, (Jun. 2016) 5 pages.
International Search Report and Written Opinion of the International Searching Authority for related application PCT/US2015/027900 mailed on Jun. 23, 2015.
International Search Report and Written Opinion of the International Searching Authority of International Application No. PCT/US2021/12018, dated Mar. 3, 2021, 5 pages.
International Search Report and Written Opinion of the International Searching Authority of International Application No. PCT/US21/12006 dated Apr. 7, 2021, 12 pages.
International Search Report and Written Opinion, PCT/US2018/063681, dated Mar. 8, 2019.
International Search Report for International Application No. PCT/US2022/073137. Oct. 11, 2022, 6 pages.
International Search Report for International Application No. PCT/US2022/076356, mailed Dec. 2, 2022, 5 pages.
International Search Report for International Application No. PCT/US2022/078524, mailed Apr. 11, 2023, 7 pages.
International Search Report for International Application No. PCT/US2023/065238, mailed Jul. 3, 2023, 6 pages.
International Search Report for PCT/US2017/043578 dated Oct. 27, 2017 by the European Patent Office.
International Search Report of International Application No. PCT/US2019/042895, dated Oct. 21, 2019, 3 pages.
International Written Opinion for International Application No. PCT/US2022/073137. Oct. 11, 2022, 9 pages.
International Written Opinion for International Application No. PCT/US2022/076356, mailed Dec. 2, 2022, 10 pages.
International Written Opinion for International Application No. PCT/US2022/078524, mailed Apr. 11, 2023, 14 pages.
International Written Opinion for International Application No. PCT/US2023/065238, mailed Jul. 3, 2023, 9 pages.
Microchip Technology Inc., "Inductive Sensor Interface IC with Embedded MCU", Summary Data Sheet LX3302A, DS20006496A (Feb. 2020) 48 pages.
Microchip Technology Inc., "Robust, Low-Cost and Noise-Immune Motion-Sensing Inductive Sensors", Automotive brochure, DS00002864A, www.microchip.com/automotive (Dec. 2018) 2 pages.
PCT/US2019/044245, International Search Report and Written Opinion of the International Searching Authority, dated Nov. 15, 2019, 10 pages.
Dauth et al., An Effective Method to Model and Simulate the Behavior of Inductive Angle Encoders, Sensors 22, No. 20: 7804, Oct. 14, 2022, 26 pages.
International Search Report and Written Opinion of the International Searching Authority for related application PCT/US2015/027900 mailed on Jun. 23, 2015, 10 pages.
International Search Report and Written Opinion of the International Searching Authority of International Application No. PCT/US2021/012006, dated Apr. 7, 2021, 12 pages.
International Search Report and Written Opinion of the International Searching Authority of International Application No. PCT/US2021/039578, mailed Oct. 14, 2021, 10 pages.
Lugani et al., High speed inductive position sensor for E-machines, Melexis Technologies SA, 2021, 7 pages.
Written Opinion of the International Searching Authority of International Application No. PCT/US2018/063681, dated Mar. 8, 2019, 7 pages.
Written Opinion of the International Searching Authority of International Application No. PCT/US2021/12018, dated Mar. 3, 2021, 5 pages.
International Search Report of International Application No. PCT/US2023/077323, mailed Jan. 22, 2024, 6 pages.
Written Opinion of the International Searching Authority of International Application No. PCT/US2023/077323, mailed Jan. 23, 2024, 9 pages.
Written Opinion of the International Search Authority of International Application No. PCT/US2019/042895, dated Oct. 21, 2019, 8 pages.

\* cited by examiner

INDUCTIVE ANGULAR-POSITION SENSORS, AND RELATED DEVICES, SYSTEMS, AND METHODS

CROSS-REFERENCE TO RELATED APPLICATION

This application claims the benefit of the priority date of Indian Provisional Patent Application No. 202141035344, filed Aug. 5, 2021, and titled "INDUCTIVE ANGULAR-POSITION SENSOR, AND RELATED DEVICES, SYSTEMS, AND METHODS," the disclosure of which is incorporated herein in its entirety by this reference.

FIELD

This description relates, generally, to inductive angular-position sensors.

BACKGROUND

If a coil of wire is placed in a changing magnetic field, a voltage will be induced at ends of the coil of wire. In a predictably changing magnetic field, the induced voltage will be predictable (based on factors including the area of the coil affected by the magnetic field and the degree of change of the magnetic field). It is possible to disturb a predictably changing magnetic field and measure a resulting change in the voltage induced in the coil of wire. Further, it is possible to create a sensor that measures movement of a disturber of a predictably changing magnetic field based on a change in a voltage induced in one or more coils of wire.

BRIEF DESCRIPTION THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

Figure 1:
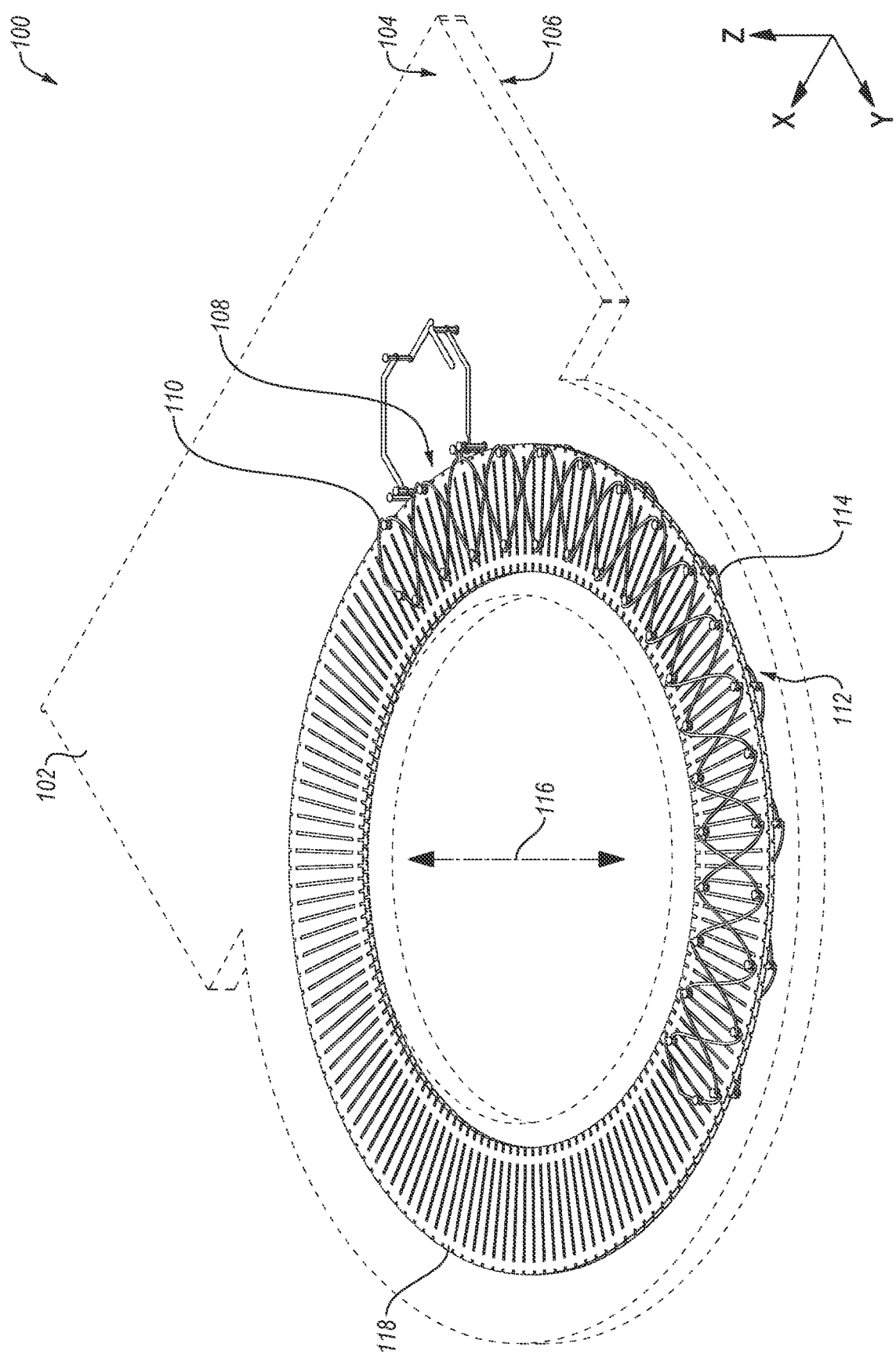
FIG. 1 is a perspective view of a layout of an apparatus according to one or more examples.

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure, but is merely representative of various examples. While the various aspects of the examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are only examples and should not be construed as the only way to implement the present disclosure unless specified otherwise herein. Additionally, block definitions and partitioning of logic between various blocks is an example of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the examples disclosed herein may be implemented or performed with a general purpose processor, a special purpose processor, a Digital Signal Processor (DSP), an Integrated Circuit, an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer executes computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

An inductive angular-position sensor may include an oscillator, one or more oscillator coils, a first sense coil, a second sense coil, and an integrated circuit. Such an inductive angular-position sensor may determine an angular position of a target relative to the one or more oscillator coils and/or the sense coils.

The oscillator may generate an excitation signal. The one or more oscillator coils may be excited by the excitation signal to produce an oscillating signal. The oscillating signal on the one or more oscillator coils may generate a changing (oscillating) magnetic field within and without a space near, or encircled by, the oscillator coil. For ease of understanding, the term "oscillator coil" may be used, it being understood that one or more oscillator coils are meant.

The first sense coil and the second sense coil may each encircle a space in which the one or more oscillator coils are capable of generating magnetic field, e.g., a space within the space encircled by the one or more oscillator coils. The changing magnetic field generated by the one or more oscillator coils may induce a first oscillating voltage at ends of the first sense coil and a second oscillating voltage at ends of the second sense coil. The first oscillating voltage at the ends of the first sense coil may oscillate in response to the oscillation of the excitation signal and may be a first sense signal. The second oscillating voltage at the ends of the second sense signal may oscillate in response to the oscillation of the excitation signal and may be a second sense signal.

The target may be positioned relative to the one or more oscillator coils, the first sense coil, and the second sense coil. For example, the target, or a portion of the target, may be positioned above a portion of the one or more oscillator coils, the first sense coil, and the second sense coil, without limitation. The target may disturb some of the changing magnetic field that passes through one or more loops of the first sense coil and the second sense coil.

The first sense coil and the second sense coil may be such that the location of the target, or the portion of the target, above one or more of the first sense coil and the second sense coil may affect the first sense signal and the second sense signal induced in the first sense coil and the second sense coil respectively. For example, in response to the target, or a portion of the target, being over a loop in the first sense coil, the amplitude of the first sense signal may be less than the amplitude of the first sense signal when the target is not over the loop in the first sense coil.

Further, the target may rotate (e.g., around an axis, without limitation) such that a portion of the target may pass over one or more loops of one or more of the one or more oscillator coils, the first sense coil and the second sense coil. As the target rotates, the first sense signal of the first sense coil and the second sense signal of the second sense coil may be amplitude modulated in response to the rotation of the target, e.g., in response to the portion of the target passing over the loops.

In various examples, the integrated circuit may generate an output signal responsive to the first sense signal and the second sense signal. The output signal may be a fraction of a rail voltage based on the first sense signal and the second sense signal. The output signal may be related to an angular position of the target, or the position of the portion of the target, and successive samples of the output signal may be related to a direction of movement of the target. Thus, the inductive angular-position sensor may generate an output signal indicative of an angular-position of a target.

In various examples, the integrated circuit may generate a first output signal based on the first sense signal and a second output signal based on the second sense signal. The first output signal may be the first sense signal demodulated; the second output signal may be the second sense signal demodulated. Together, the two output signals may be related to an angular position of the target and subsequent samples of the first and second output signals may be indicative of rotation of the target.

In various examples, the integrated circuit may generate a single output signal based on the first sense signal and the second sense signal. Some examples include sense coils that cause an integrated circuit to generate a constant-slope output signal in response to rotation of the target relative to the first sense coil and the second sense coil. The constant-slope output signal may be an output signal with a known correlation between an amplitude of the output signal and the angular position of the target.

Some examples include multiple inductive angular-position sensors to provide multiple and/or redundant output signals each indicative of an angular position of a target. As a non-limiting example, an apparatus may include a first inductive angular-position sensor arranged on a first side of a support structure, e.g., a left side, and a second inductive angular-position sensor arranged on a second side of the support structure, the second side opposing the first side, e.g., a right side. In this example, both the first inductive angular-position sensor and the second inductive angular-position sensor are on, or within, a single portion of the support structure generally defining a plane. As a non-limiting example, each of the first and second inductive angular-position sensors may include two sense coils and an oscillator coil formed of conductive material arranged on and/or in a printed circuit board (PCB). The two sense coils and the oscillator coil of the first inductive angular-position sensor may be arranged on and/or in a first side of the PCB, e.g., a left side, and the two sense coils and the oscillator coil of the second inductive angular-position sensor may be arranged on and/or in a second side of the PCB, e.g., a right side. The first and second inductive angular-position sensors may respectively provide an independent output signal. Each of the independent output signals may be indicative of an angular position of the target. In such examples, the sense coils and/or the oscillator coils of one or both of the inductive angular-position sensors may be arranged at least partially around an axis of rotation of the target. Further, the target may include fins extending above the sense coils and/or the oscillator coils to disrupt a magnetic field between the oscillator coils and the sense coils.

Another example apparatus may include a first inductive angular-position sensor arranged at a first portion of a support structure, e.g., at a top portion of the support structure, and a second inductive angular-position sensor arranged at a second portion of the support structure, opposing the first portion of the support structure e.g., a bottom portion of the support structure. Each of the first and second inductive angular-position sensors may include two sense coils and an oscillator coil formed of conductive material arranged on and/or in a printed circuit board (PCB). As a non-limiting example, the two sense coils and the oscillator coil of the first inductive angular-position sensor may be arranged at a first portion of a PCB, e.g., a top portion, and the two sense coils and the oscillator coil of the second inductive angular-position sensor may be arranged at a second portion of the PCB, opposing the first portion of the PCB, e.g., a bottom portion. The first and second inductive angular-position sensors may respectively provide an independent output signal. Each of the independent output signals may be indicative of an angular position of the target. In such examples, the sense coils and/or the oscillator coils of one or both of the first and second inductive angular-position sensors may be arranged at least partially around an axis of rotation of the target and the target may include fins extending above and/or below the sense coils and/or the oscillator coils. As a non-limiting example, the target may include a first number of fins that extend above the top portion of the support structure (and above the sense coils and oscillator coil of the first inductive angular-position sensor arranged at the top portion). Further, the target may include a second number fins that extend below the bottom portion of the support structure (and below the sense coils and oscillator coil of the second inductive angular-position sensor arranged at the bottom portion). In such cases the target may include a connector portion connecting the first number fins to the second number of fins. Such a connector portion may extend through a hole in the support structure.

In the present disclosure, references to things (including sense coils, oscillator coils, and paths, without limitation) being "at," "in," "on," "arranged at," "arranged in," "arranged on" and like terms a "top portion," a "bottom portion," a "left side," and/or a "right side" of a support structure may refer to the things being arranged substantially within and/or on a top portion, a bottom portion, a left side, or a right side, respectively, of the support structure. As a non-limiting example, sense coils may include conductive lines in one or more planes (e.g., layers) of the PCB. A sense coil arranged at a top portion of a support structure may include conductive lines in multiple layers within the top portion of a PCB, i.e., within top layers of a multi-layer PCB and a sense coil arranged at a bottom portion of a support structure may include conductive lines in multiple layers within the top portion of a PCB, i.e., within bottom layers of the multi-layer PCB. Similarly, a sense coil arranged at a left side of a support structure may include conductive lines in multiple layers within the left side of a PCB and a sense coil arranged at a right side of a support structure may include conductive lines in multiple layers within the right side of the PCB. Similarly, a sense coil arranged at a left side of a top portion of a support structure may include conductive lines in multiple layers of a left side of a top portion of a PCB. Further, the terms "left" and "right" and "top" and "bottom" are not absolute, as they depend on the orientation of the viewer, and are given as non-limiting examples.

Some examples may include a shield between the first inductive angular-position sensor at the top portion of the support structure and the second inductive angular-position sensor at the bottom portion of the support structure. The shield may be of conductive material in one or more layers of the support structure. The shield may disrupt magnetic field between the oscillator coil of the first inductive angular-position sensor and the sense coils of the second inductive angular-position sensor and/or between the oscillator coil of the second inductive angular-position sensor and the sense coils of the first inductive angular-position sensor.

Some examples may include three or more inductive angular-position sensors. As a non-limiting example, some examples may include four independent inductive angular-position sensors e.g., a first inductive angular-position sensor at a left side of a top portion of the support structure, a second inductive angular-position sensor at a left side of a bottom portion of the support structure, a third inductive angular-position sensor at a right side of the top portion of the support structure, and a fourth inductive angular-position sensor at a right side of the bottom portion of the support structure. Such examples may include a shield between the first and third inductive angular-position sensors at the top portion and the second and fourth inductive angular-position sensors at the bottom portion.

In the present disclosure, references to an inductive angular-position sensor being "at," "in," "on," or like terms, a location of a support structure may refer to sense coils and/or an oscillator coil of the inductive angular-position sensor being at the location. References to an inductive angular-position sensor being "at," "in," "on," or like terms, a location of the support structure does not necessitate an integrated circuit, an oscillator, and/or other elements of the inductive angular-position sensor, being at the location. As a non-limiting example, a reference to an inductive angular-position sensor being at a left side of a top portion of a support structure may mean that the sense coils and the oscillator coil of the inductive angular-position sensor is at the left side of a top portion of the support structure. The inductive angular-position sensor may further include an integrated circuit that may be at another side and/or another portion of the support structure.

FIG. 1 is a perspective view of a layout of an apparatus 100 according to one or more examples. Apparatus 100 may include a respective oscillator coil and two respective sense coils of two inductive angular-position sensors (e.g., a first inductive angular-position sensor 108 with a respective oscillator coil and two respective sense coils and a second inductive angular-position sensor 112 a respective oscillator coil and two respective sense coils, without limitation). The two inductive angular-position sensors may respectively independently provide sense signals (not illustrated in FIG. 1) indicative of an angular position of a disturbance element or "target" (such a target not illustrated in FIG. 1) relative to the inductive angular-position sensors.

Apparatus 100 may include a support structure 102. Support structure 102 may have a first portion 104 (e.g., a "top portion 104") defining a first plane and a second portion 106 (e.g., a "bottom portion 106") defining a second plane parallel to the first plane. Apparatus 100 may include first inductive angular-position sensor 108. First inductive angular-position sensor 108 may include a respective first sense coil 110 arranged at first portion 104 of support structure 102. First sense coil 110 may at least partially circumscribe an axis 116. Apparatus 100 may include second inductive angular-position sensor 112. Second inductive angular-position sensor 112 may include a respective first sense coil 114 arranged opposite first sense coil 110 of first inductive angular-position sensor 108 at second portion 106 of support structure 102 (e.g., first sense coil 114 of second inductive angular-position sensor 112 may be on the opposite side of support structure 102 from first sense coil 110 of first inductive angular-position sensor 108). First sense coil 114 of second inductive angular-position sensor 112 may at least partially circumscribe axis 116. Apparatus 100 may include a shield 118 arranged between the first sense coil 110 of first inductive angular-position sensor 108 and first sense coil 114 of second inductive angular-position sensor 112. First sense coil 110 of first inductive angular-position sensor 108 may be electrically isolated from first sense coil 114 of second inductive angular-position sensor 112.

First sense coil 110 of first inductive angular-position sensor 108 and first sense coil 114 of second inductive angular-position sensor 112 may be formed of conductive material and may provide respective paths for electrical current. First sense coil 110 of first inductive angular-position sensor 108 and first sense coil 114 of second inductive angular-position sensor 112 may be respectively arranged in two or more respective planes connected by vias e.g., such that a segment of first sense coil 110 of first inductive angular-position sensor 108 may pass over another segment of first sense coil 110 of first inductive angular-position sensor 108 without electrically connecting. Support structure 102 may be formed of a nonconductive material to support first sense coil 110 of first inductive angular-position sensor 108 and first sense coil 114 of second inductive angular-position sensor 112 in one or more planes or layers. First sense coil 110 of first inductive angular-position sensor 108 and first sense coil 114 of second inductive angular-position sensor 112 on, or in, support structure 102 may be conductive lines on, or in, a PCB. Support structure 102 may be a PCB. Unless stated otherwise, other coils (e.g., second sense coils and oscillator coils) and electrical connections between coils and integrated circuits described herein may likewise be conductive lines on, or in, a PCB.

An apparatus including multiple inductive angular-position sensors may include an instance of apparatus 100 and additional elements omitted from FIG. 1 for descriptive purposes. As a non-limiting example, an instance of first inductive angular-position sensor 108 may additionally include a respective second sense coil and a respective oscillator coil arranged at first portion 104. Additionally, an instance of second inductive angular-position sensor 112 may additionally include a respective second sense coil a respective oscillator coil arranged at second portion 106.

Shield 118 may be formed of conductive material and may be supported by support structure 102. Shield 118 may be included in one or more planes which may or may not be electrically connected by vias. Shield 118 may disrupt a magnetic-field interaction between the respective oscillator coil of second inductive angular-position sensor 112 and first sense coil 110 of first inductive angular-position sensor 108. Shield 118 may additionally disrupt magnetic-field interaction between the respective second oscillator coil of first inductive angular-position sensor 108 and first sense coil 114 of second inductive angular-position sensor 112.

First sense coil 110, the second sense coil, and the oscillator coil of first inductive angular-position sensor 108 may be arranged such that if a portion of a target were above first sense coil 110, the second sense coil, and the oscillator coil, the first sense coil 110 and the second sense coil of first inductive angular-position sensor 108 may generate respective first and second sense signals which may be interpretable by an integrated circuit (e.g., an integrated circuit of first inductive angular-position sensor 108 (not illustrated in FIG. 1)) to indicate an angular position of the target. Similarly, first sense coil 114, the second sense coil, and the oscillator coil of second inductive angular-position sensor 112 may be arranged such that if a portion of a target were below first sense coil 114, the second sense coil, and the oscillator coil of second inductive angular-position sensor 112, the first sense coil 114 and the second sense coil of second inductive angular-position sensor 112 may generate respective first and second sense signals which may be interpretable by an integrated circuit (e.g., an integrated circuit of second inductive angular-position sensor 112 (not illustrated in FIG. 1)) to indicate an angular position of the target. The first and second sense signals of first inductive angular-position sensor 108 may be independent of the first and second sense signals of second inductive angular-position sensor 112. As a non-limiting example, first inductive angular-position sensor 108 may generate the respective first and second sense signals independently of whether second inductive angular-position sensor 112 generates the respective first and second sense signals. Thus, first inductive angular-position sensor 108 and second inductive angular-position sensor 112 may provide redundancy in apparatus 100.

FIG. 1 illustrates two inductive angular-position sensors, i.e., first inductive angular-position sensor 108 and second inductive angular-position sensor 112, arranged in two planes as a non-limiting example. Other examples may include additional inductive angular-position sensors arranged in additional planes. There may be additional shields between the additional planes.

Figure 2:
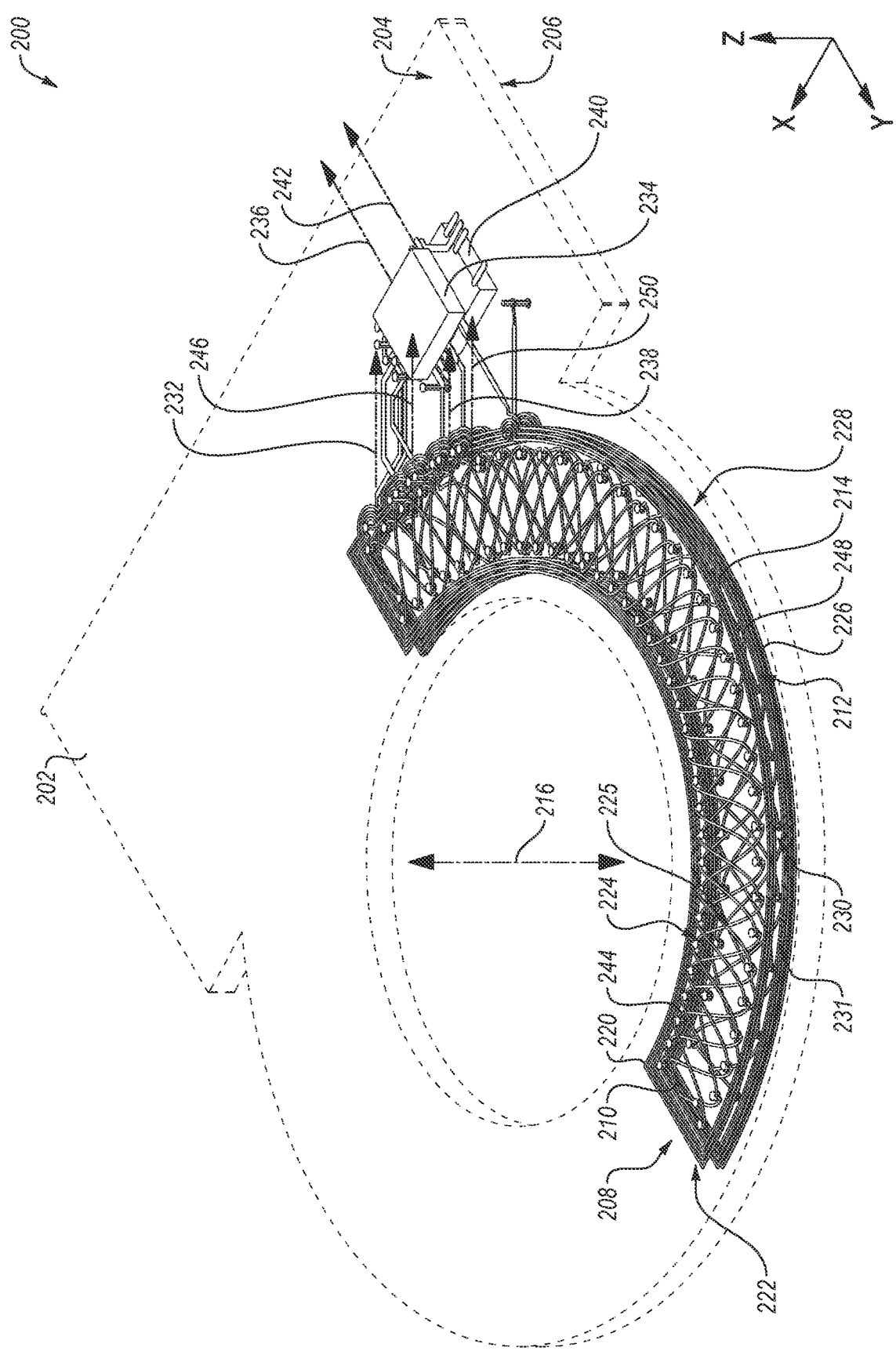
FIG. 2 is a perspective view of a layout of an apparatus according to one or more examples.

FIG. 2 is a perspective view of an example layout of an apparatus 200 according to one or more examples. Apparatus 200 may include elements of two inductive angular-position sensors (e.g., a first inductive angular-position sensor 208 and a second inductive angular-position sensor 212). Each of first inductive angular-position sensor 208 and second inductive angular-position sensor 212 may independently provide sense signals (e.g., a respective first sense signal 232 and a second sense signal 246 of first inductive angular-position sensor 208, and a respective first sense signal 238, and a second sense signal 250 of second inductive angular-position sensor 212) indicative of an angular position of a target (not illustrated in FIG. 2) relative to the inductive angular-position sensors.

Apparatus 200 is a non-limiting example of apparatus 100 of FIG. 1. However, in FIG. 2, different elements of apparatus 200 are illustrated than were illustrated with regard to apparatus 100 of FIG. 1.

In the present disclosure, two reference number having the same last two digits may indicate that the elements referenced by the reference numbers are substantially the same between the different examples illustrated by different drawings, absent explicit description to the contrary. As a non-limiting example, support structure 202 (including first portion 204 and second portion 206) of FIG. 2 may be substantially the same as support structure 102 (including first portion 104 and second portion 106) of FIG. 1.

In addition to the elements that are substantially the same as elements described with relation to apparatus 100 of FIG. 1, apparatus 200 includes an oscillator coil 220 and a second sense coil 244 of first inductive angular-position sensor 208. Apparatus 200 also includes an oscillator coil 226 and a second sense coil 248 of second inductive angular-position sensor 212. Oscillator coil 220 of first inductive angular-position sensor 208 may define a respective at-least-partially-annular shaped path 222 for electrical current of first inductive angular-position sensor 208. At-least-partially-annular shaped path 222 of first inductive angular-position sensor 208 may at least partially circumscribe axis 216. First sense coil 210 of first inductive angular-position sensor 208 may define a respective first substantially-sinusoidal-wave-shaped path 224 for electrical current of first inductive angular-position sensor 208. Similarly, second sense coil 244 of first inductive angular-position sensor 208 may define a respective second substantially-sinusoidal-wave-shaped path 225 for electrical current. First substantially-sinusoidal-wave-shaped path 224 of first sense coil 210 and the second substantially-sinusoidal-wave-shaped path 225 of second sense coil 244, of first inductive angular-position sensor 208, may be substantially within (from a top-view perspective) at-least-partially-annular shaped path 222 of oscillator coil 220 of first inductive angular-position sensor 208 (whether first sense coil 210, second sense coil 244, and oscillator coil 220 are in the same plane or not). Oscillator coil 226 of second inductive angular-position sensor 212 may define a respective at-least-partially-annular shaped path 228 for electrical current. At-least-partially-annular shaped path 228 may at least partially circumscribe axis 216. First sense coil 214 of second inductive angular-position sensor 212 may define a respective first substantially-sinusoidal-wave-shaped path 230 for electrical current of second inductive angular-position sensor 212. Similarly, second sense coil 248 of second inductive angular-position sensor 212 may define a respective second substantially-sinusoidal-wave-shaped path 231 for electrical current. First substantially-sinusoidal-wave-shaped path 230 of first sense coil 214 and the second substantially-sinusoidal-wave-shaped path 231 of second sense coil 248, of second inductive angular-position sensor 212, may be substantially within (from a top-view perspective) respective at-least-partially-annular shaped path 228 of oscillator coil 226 (whether first sense coil 214, second sense coil 248, and oscillator coil 226 of second inductive angular-position sensor 212 are in the same plane or not). First sense coil 210, oscillator coil 220, and second sense coil 244 of first inductive angular-position sensor 208 may be electrically isolated from first sense coil 214, oscillator coil 226, and second sense coil 248 of second inductive angular-position sensor 212.

Further, in addition to the elements that are substantially the same as elements described with relation to apparatus 100 of FIG. 1, apparatus 200 includes a first integrated circuit 234 and a second integrated circuit 240. First sense coil 210 of first inductive angular-position sensor 208 may generate first sense signal 232 responsive to an angular position of a target (not illustrated in FIG. 2) above first sense coil 210. Second sense coil 244 of first inductive angular-position sensor 208 may generate second sense signal 246 responsive to an angular position of the target above second sense coil 244. First integrated circuit 234 may generate a first position signal 236 responsive to first sense signal 232 and second sense signal 246. First position signal 236 may be indicative of the angular position of the target above first sense coil 210 and second sense coil 244 of first inductive angular-position sensor 208. First sense coil 214 of second inductive angular-position sensor 212 may generate respective first sense signal 238 responsive to a position of a target (not illustrated in FIG. 2) below first sense coil 214 of second inductive angular-position sensor 212. Second sense coil 248 of second inductive angular-position sensor 212 may generate respective second sense signal 250 responsive to a position of a target (not illustrated in FIG. 2) below second sense coil 248. Second integrated circuit 240 may generate a second position signal 242 responsive to first sense signal 238 and second sense signal 250 of second inductive angular-position sensor 212. Second position signal 242 may be indicative of the angular position of the target below first sense coil 214 and second sense coil 248 of second inductive angular-position sensor 212. In some examples, first integrated circuit 234 and second integrated circuit 240 may be provided as a single integrated circuit, or may be included in a common integrated circuit package, without limitation.

Apparatus 200 may include a shield (not illustrated in FIG. 2 for clarity) that may be substantially the same as shield 118 of FIG. 1. The shield may disrupt magnetic-field interaction between oscillator coil 220 of first inductive angular-position sensor 208 and first sense coil 214 and second sense coil 248 of second inductive angular-position sensor 212. The shield may disrupt a magnetic-field interaction between oscillator coil 226 of second inductive angular-position sensor 212 and first sense coil 210 and second sense coil 244 of first inductive angular-position sensor 208.

First substantially-sinusoidal-wave-shaped path 224 of first inductive angular-position sensor 208 and first substantially-sinusoidal-wave-shaped path 230 are periodic (e.g., first substantially-sinusoidal-wave-shaped path 224 includes repeating portions and first substantially-sinusoidal-wave-shaped path 230 similarly includes repeating portions). The frequency of repeating portions of first substantially-sinusoidal-wave-shaped path 224 (e.g., the number of periods of sinusoidal waves completed by first sense coil 210 in first substantially-sinusoidal-wave-shaped path 224), of first inductive angular-position sensor 208, may be different from the frequency of repeating portions of first substantially-sinusoidal-wave-shaped path 230 of second inductive angular-position sensor 212, or it may be the same. The frequency of repeating portions of all the substantially-sinusoidal-wave-shaped paths of all of the sense coils of the present disclosure are given as examples. The frequency of repeating portions of the substantially-sinusoidal-wave-shaped paths of respective sense coils may be a design choice. Additionally, it may be advantageous to select for an apparatus inductive angular-position sensors having a variety of frequencies of repeating portions to their respective sense coils e.g., as illustrated by the difference in the frequencies of repeating portions illustrated by first substantially-sinusoidal-wave-shaped path 224 of first inductive angular-position sensor 208 and first substantially-sinusoidal-wave-shaped path 230 of second inductive angular-position sensor 212.

Figure 3:
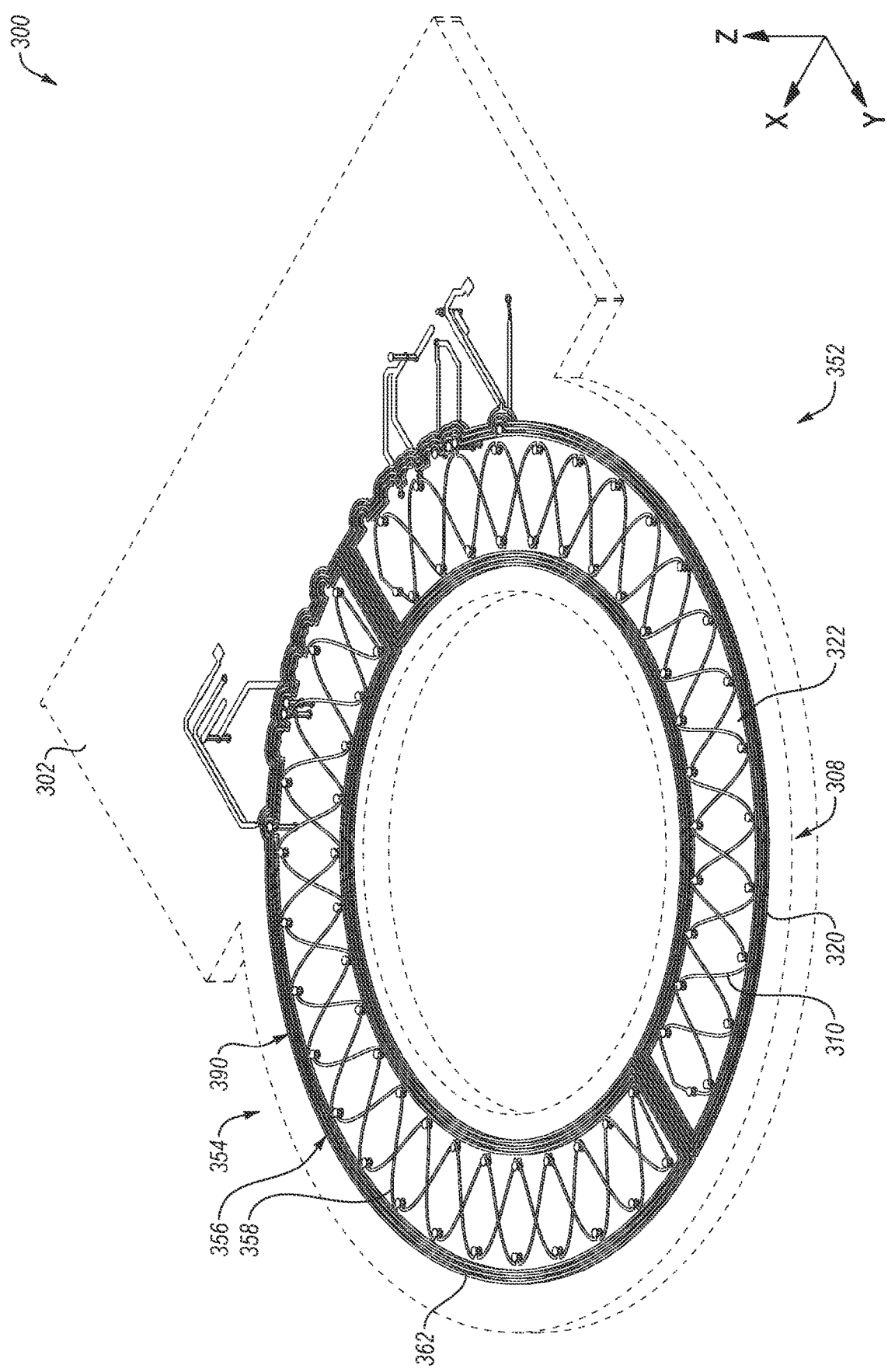
FIG. 3 is a perspective view of a layout of an apparatus according to one or more examples.

FIG. 3 is a perspective view of an example layout of an apparatus 300 according to one or more examples. Apparatus 300 may include elements of two inductive angular-position sensors (e.g., a first inductive angular-position sensor 308 and a second inductive angular-position sensor 356, without limitation). First inductive angular-position sensors 308 and second inductive angular-position sensor 356 may independently provide respective sense signals (not illustrated in FIG. 3) indicative of an angular position of a target (such target not illustrated in FIG. 3) relative to the inductive angular-position sensors.

Apparatus 300 may include a support structure 302. Apparatus 300 may include first inductive angular-position sensor 308. First inductive angular-position sensor 308 may include a respective oscillator coil 320. Oscillator coil 320 of first inductive angular-position sensor 308 may define a respective path 322 ("at-least-partially-annular shaped path 322" which may be substantially similar to at-least-partially-annular shaped path 222 of FIG. 2) for electrical current. Oscillator coil 320 of first inductive angular-position sensor 308 may be arranged at a first side 352 of support structure 302. First inductive angular-position sensor 308 may include a first sense coil 310 arranged substantially within (from a top-view perspective) path 322. Apparatus 300 may include second inductive angular-position sensor 356. Second inductive angular-position sensor 356 may include a respective oscillator coil 362. Oscillator coil 362 may define a respective path 390 ("at-least-partially-annular shaped path 390") for electrical current. Oscillator coil 362 of second inductive angular-position sensor 356 may be arranged at a second side 354 of support structure 302. Second inductive angular-position sensor 356 may include a respective first sense coil 358 arranged substantially within (from top-view perspective) the path 390. First inductive angular-position sensor 308 and second inductive angular-position sensors 356 are at different sides of support structure 302, however on a single portion thereof, although they may occupy multiple layers thereof. First sense coil 310 and oscillator coil 320 of first inductive angular-position sensor 308 may be electrically isolated from first sense coil 358 and oscillator coil 362 of second inductive angular-position sensor 356.

An apparatus including multiple inductive angular-position sensors may include an instance of apparatus 300 and additional elements omitted from FIG. 3 for descriptive purposes. As a non-limiting example, an instance of first inductive angular-position sensor 308 may additionally include a respective second sense coil arranged at first side 352. Additionally, an instance of second inductive angular-position sensor 356 may additionally include a respective second sense coil arranged at second side 354.

First sense coil 310, the second sense coil, and oscillator coil 320 of first inductive angular-position sensor 308 may be arranged such that if a portion of a target were above first sense coil 310, the second sense coil, and oscillator coil 320, the first sense coil 310 and the second sense coil may generate respective first and second sense signals which may be interpretable by an integrated circuit (e.g., an integrated circuit of first inductive angular-position sensor 308 (not illustrated in FIG. 3)) to indicate an angular position of the target. Similarly, first sense coil 358, the second sense coil, and the oscillator coil 362 of second inductive angular-position sensor 356 may be arranged such that if a portion of a target were above first sense coil 358, the second sense coil, and oscillator coil 362 of second inductive angular-position sensor 356, the first sense coil 358 and the second sense coil of second inductive angular-position sensor 356 may generate respective first and second sense signals of second inductive angular-position sensor 356 which may be interpretable by an integrated circuit (e.g., an integrated circuit of second inductive angular-position sensor 356 (not illustrated in FIG. 3), without limitation) to indicate an angular position of the target. The first and second sense signals of first inductive angular-position sensor 308 may be independent of the first and second sense signals of second inductive angular-position sensor 356. As a non-limiting example, first inductive angular-position sensor 308 may generate the respective first and second sense signals independent of whether second inductive angular-position sensor 356 generates the respective first and second sense signals. Thus, first inductive angular-position sensor 308 and second inductive angular-position sensor 356 may provide redundancy in apparatus 300.

FIG. 3 illustrates two inductive angular-position sensors, i.e., first inductive angular-position sensor 308 and second inductive angular-position sensor 356, arranged circumferentially around an axis as a non-limiting example. Other examples may include additional inductive angular-position sensors arranged circumferentially around the axis.

Figure 4:
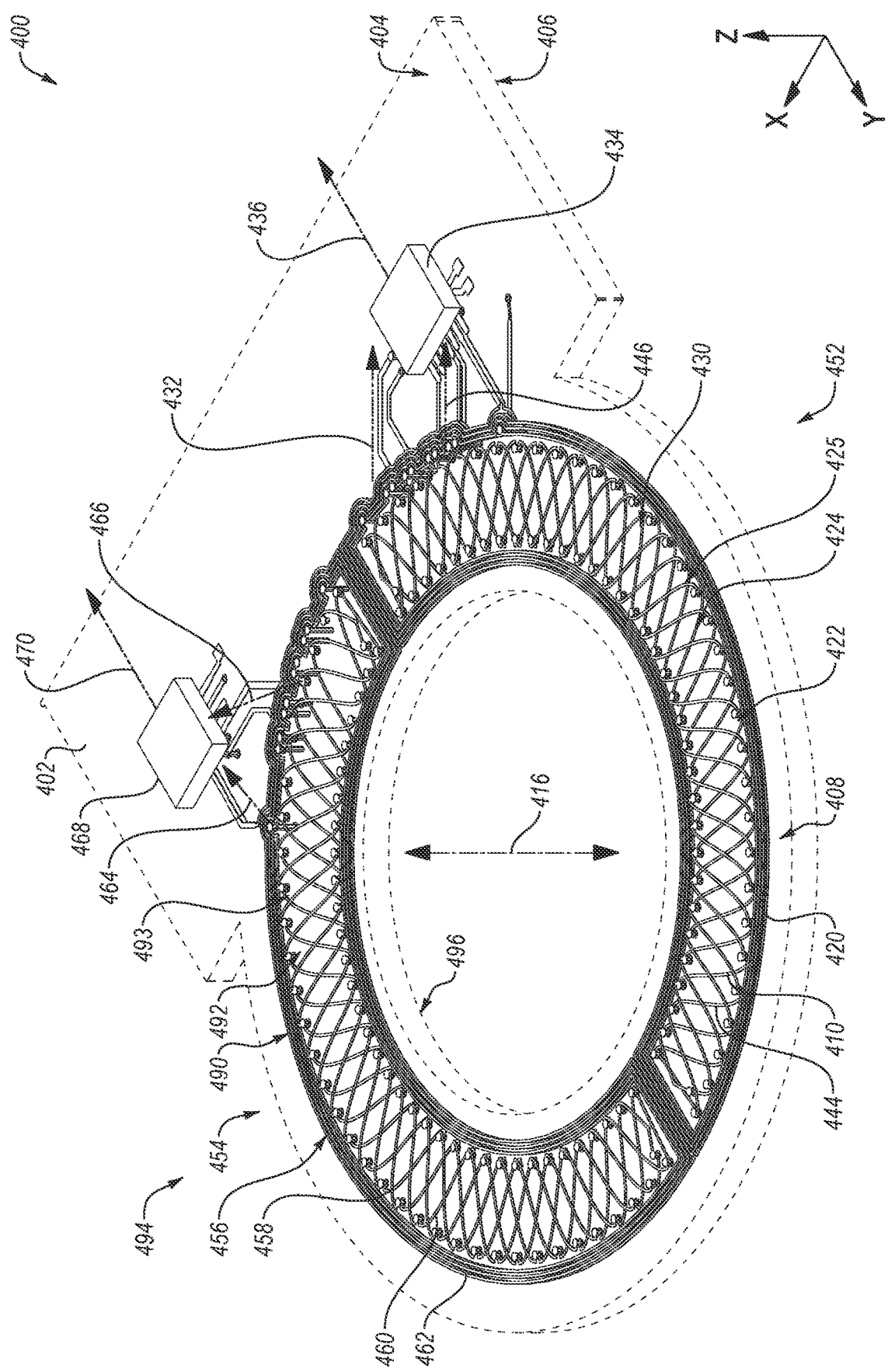
FIG. 4 is a perspective view of a layout of an apparatus according to one or more examples.

FIG. 4 is a perspective view of a layout of an apparatus 400 according to one or more examples. Apparatus 400 may include elements of two inductive angular-position sensors (e.g., a first inductive angular-position sensor 408 and a second inductive angular-position sensor 456). The first inductive angular-position sensor 408 and second inductive angular-position sensor 456 may independently provide respective sense signals (e.g., a first sense signal 432 and a second sense signal 446 of first inductive angular-position sensor 408 and a first sense signal 464 and a second sense signal 466 of second inductive angular-position sensor 456) indicative of an angular position of a target (not illustrated in FIG. 4) relative to the inductive angular-position sensors.

Apparatus 400 may be an example of apparatus 300 of FIG. 3. However, in FIG. 4, different elements of apparatus 400 are illustrated than were illustrated with regard to apparatus 300 of FIG. 3.

In addition to the elements that are substantially the same as elements described with relation to apparatus 300 of FIG. 3, apparatus 400 includes a second sense coil 444 of first inductive angular-position sensor 408 and a second sense coil 460 of second inductive angular-position sensor 456. Oscillator coil 420 of first inductive angular-position sensor 408 may define a respective semiannularly-shaped path 422 for electrical current (which may be substantially similar to path 322 of FIG. 3 and at-least-partially-annular shaped path 222 of FIG. 2). Semiannularly-shaped path 422 may at least partially circumscribe axis 416. First sense coil 410 of first inductive angular-position sensor 408 may define a first substantially-sinusoidal-wave-shaped path 424 of first inductive angular-position sensor 408 for electrical current. Similarly, second sense coil 444 of first inductive angular-position sensor 408 may define a second substantially-sinusoidal-wave-shaped path 425 of first inductive angular-position sensor 408 for electrical current. First substantially-sinusoidal-wave-shaped path 424 of first sense coil 410 and the second substantially-sinusoidal-wave-shaped path 425 of second sense coil 444 may be substantially within (from a top-view perspective) semiannularly-shaped path 422 of oscillator coil 420 (whether first sense coil 410, second sense coil 444, and oscillator coil 420 are in the same plane or not). Oscillator coil 462 of second inductive angular-position sensor 456 may define a respective semiannularly-shaped path 490 (which may be substantially similar to path 390 of FIG. 3) for electrical current. Semiannularly-shaped path 490 may at least partially circumscribe axis 416. First sense coil 458 of second inductive angular-position sensor 456 may define a respective first substantially-sinusoidal-wave-shaped path 492 for electrical current. Similarly, second sense coil 460 of second inductive angular-position sensor 456 may define a respective second substantially-sinusoidal-wave-shaped path 493 for electrical current. Substantially-sinusoidal-wave-shaped path 492 of first sense coil 458 and the second substantially-sinusoidal-wave-shaped path 493 of second sense coil 460, of second inductive angular-position sensor 456, may be substantially within (from a top-view perspective) semiannularly-shaped path 490 of oscillator coil 462 (whether first sense coil 458, second sense coil 460, and oscillator coil 462 are in the same plane or not). First sense coil 410, second sense coil 444, and oscillator coil 420 of first inductive angular-position sensor 408 may be electrically isolated from first sense coil 458, second sense coil 460 and oscillator coil 462 of second inductive angular-position sensor 456.

Further, in addition to the elements that are substantially the same as elements described with relation to apparatus 300 of FIG. 3, apparatus 400 includes a first integrated circuit 434 and a second integrated circuit 468. First sense coil 410 of first inductive angular-position sensor 408 may generate first sense signal 432 responsive to an angular position of a target (not illustrated in FIG. 4) above first sense coil 410. Second sense coil 444 of first inductive angular-position sensor 408 may generate second sense signal 446 responsive to an angular position of the target above second sense coil 444 of first inductive angular-position sensor 408. First integrated circuit 434 may generate a first position signal 436 responsive to first sense signal 432 and second sense signal 446. First position signal 436 may be indicative of the angular position of the target above first sense coil 410 and/or second sense coil 444 of first inductive angular-position sensor 408. First sense coil 458 of second inductive angular-position sensor 456 may generate respective first sense signal 464 responsive to a position of a target (not illustrated in FIG. 4) above first sense coil 458 of second inductive angular-position sensor 456. Second sense coil 460 of second inductive angular-position sensor 456 may generate respective second sense signals 466 responsive to a position of a target (not illustrated in FIG. 4) above second sense coil 460 of second inductive angular-position sensor 456. Second integrated circuit 468 may generate a second position signal 470 responsive to first sense signal 464 and second sense signal 466. Second position signal 470 may be indicative of the angular position of the target above first sense coil 458 and/or second sense coil 460 of second inductive angular-position sensor 456. In some examples, first integrated circuit 434 and second integrated circuit 468 may be provided as a single integrated circuit, or may be included in a common integrated circuit package, without limitation.

Further, in addition to the elements that are substantially the same as elements described with relation to apparatus 300 of FIG. 3, labeled in FIG. 4, are an annulus 494 (e.g., an annular shape of support structure 402) and an inner radius 496 of annulus 494. A target, or a portion of a target may be positioned within inner radius 496. Additional details regarding an example target are given with regard to FIG. 10A and FIG. 10B.

Figure 5:
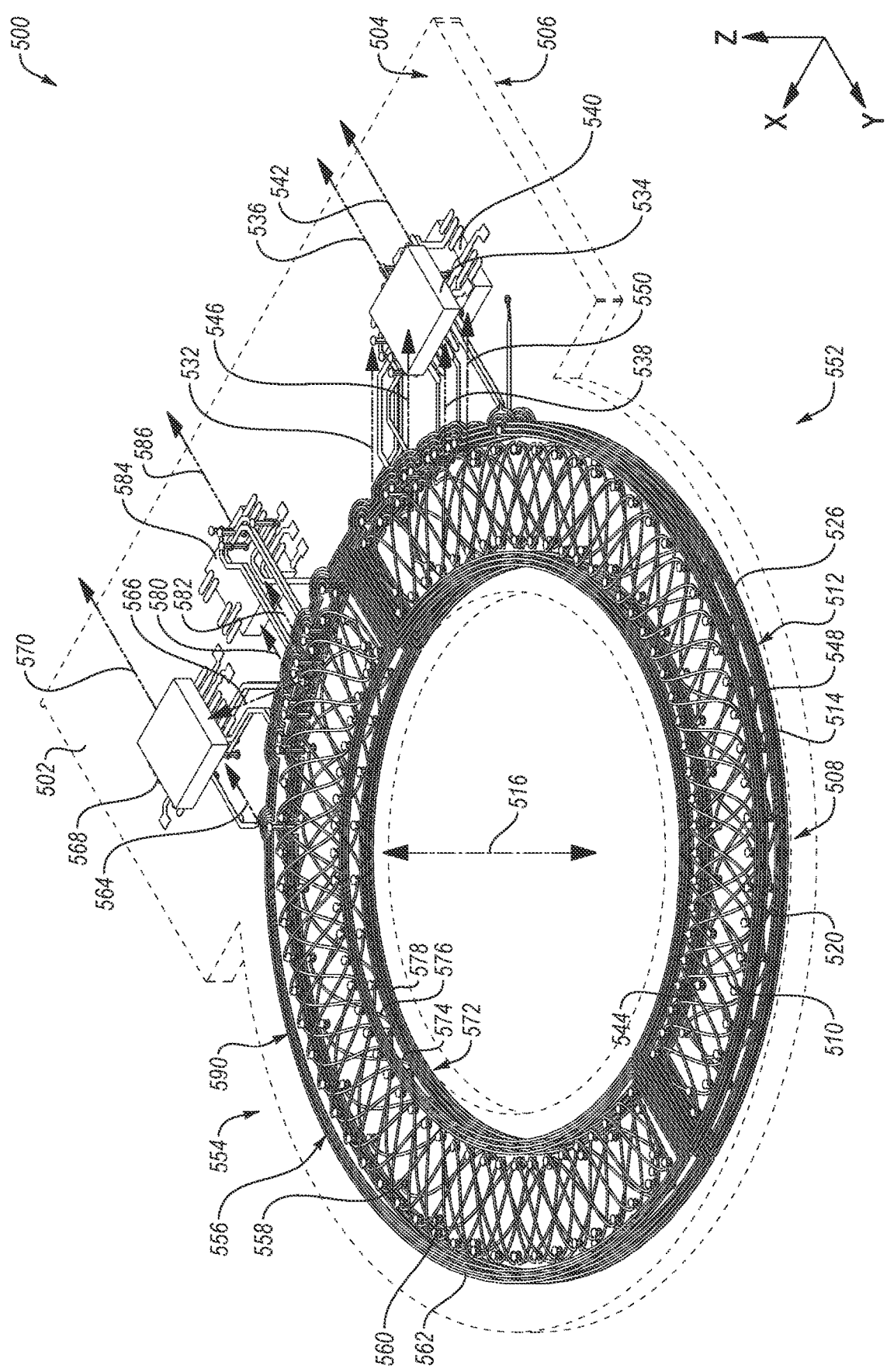
FIG. 5 is a perspective view of a layout of an apparatus according to one or more examples.

FIG. 5 is a perspective view of a layout of an apparatus 500 according to one or more examples. Apparatus 500 may include elements of more than two inductive angular-position sensors (e.g., a first inductive angular-position sensor 508, a second inductive angular-position sensor 512, a third inductive angular-position sensor 556, and/or fourth inductive angular-position sensor 572). Each of the more than two inductive angular-position sensors may independently provide respective sense signals indicative of an angular position of a target (not illustrated in FIG. 5) relative to the respective inductive angular-position sensors.

Apparatus 500 may include an instance of the inductive angular-position sensors illustrated and described with respect to apparatus 100 of FIG. 1 and apparatus 200 of FIG. 2. As a non-limiting example, apparatus 500 may include the two inductive angular-position sensors of apparatus 100 and/or apparatus 200 at a first side 552 of apparatus 500 and one or more additional inductive angular-position sensors at a second side 554 of apparatus 500.

Similar to apparatus 200 of FIG. 2, apparatus 500 may include a first inductive angular-position sensor 508 arranged at first side 552 of a first portion 504. First inductive angular-position sensor 508 may include a respective first sense coil 510, a respective second sense coil 544, and a respective oscillator coil 520 all arranged at first side 552 of first portion 504. Oscillator coil 520 may carry a respective oscillating signal, which may generate a magnetic field. The magnetic field may induce a respective first sense signal 532 in first sense coil 510 and a respective second sense signal 546 in second sense coil 544. First sense signal 532 and second sense signal 546 may be affected by a portion of a target (not illustrated in FIG. 5) passing over first sense coil 510, second sense coil 544, and/or oscillator coil 520. A first integrated circuit 534 may receive first sense signal 532 and/or second sense signal 546 of first inductive angular-position sensor 508 and may determine an angular position of the target responsive to first sense signal 532 and/or second sense signal 546 first inductive angular-position sensor 508. First integrated circuit 534 may generate a first position signal 536 which may be indicative of the angular position of the target in relation to first inductive angular-position sensor 508.

Further similar to apparatus 200 of FIG. 2, apparatus 500 may include second inductive angular-position sensor 512 arranged at first side 552 of a second portion 506. Second inductive angular-position sensor 512 may include a respective first sense coil 514, a respective second sense coil 548, and a respective oscillator coil 526 all arranged at first side 552 of second portion 506. Oscillator coil 526 of second inductive angular-position sensor 512 may carry a respective oscillating signal, which may generate a magnetic field. The magnetic field may induce a respective first sense signal 538 in first sense coil 514 and a respective second sense signal 550 in second sense coil 548. First sense signal 538 and second sense signal 550 of second inductive angular-position sensor 512 may be affected by a portion of a target passing under, i.e., laterally adjacent, first sense coil 514, second sense coil 548, and/or oscillator coil 526 of second inductive angular-position sensor 512. A second integrated circuit 540 may receive first sense signal 538 and/or second sense signal 550 of second inductive angular-position sensor 512 and may determine an angular position of the target responsive to first sense signal 538 and/or second sense signal 550. Second integrated circuit 540 may generate a second position signal 542 which may be indicative of the angular position of the target in relation to second inductive angular-position sensor 512. In some examples, first integrated circuit 534 and second integrated circuit 540 may be provided as a single integrated circuit, or may be included in a common integrated circuit package, without limitation.

Further, similar to apparatus 400 of FIG. 4, apparatus 500 may include third inductive angular-position sensor 556 arranged at second side 554 of first portion 504. Third inductive angular-position sensor 556 may include a respective first sense coil 558, a respective second sense coil 560, and a respective oscillator coil 562 all arranged at second side 554 of first portion 504. Oscillator coil 562 of third inductive angular-position sensor 556 may carry a respective oscillating signal, which may generate a magnetic field. The magnetic field may induce a respective first sense signal 564 in first sense coil 558 and a respective second sense signal 566 in second sense coil 560, of third inductive angular-position sensor 556. First sense signal 564 and second sense signal 566 of third inductive angular-position sensor 556 may be affected by a portion of a target passing over, i.e., laterally adjacent, first sense coil 558, second sense coil 560, and/or oscillator coil 562 of third inductive angular-position sensor 556. A third integrated circuit 568 may receive first sense signal 564 and/or second sense signal 566 of third inductive angular-position sensor 556 and may determine an angular position of the target responsive to first sense signal 564 and/or second sense signal 566 of third inductive angular-position sensor 556. Third integrated circuit 568 may generate a third position signal 570 which may be indicative of the angular position of the target in relation to third inductive angular-position sensor 556. In some examples, one or more of first integrated circuit 534, second integrated circuit 540, and third integrated circuit 568 may be provided as a single integrated circuit, or may be included in a common integrated circuit package, without limitation.

Further, and similar to similar to apparatus 200 of FIG. 2 and apparatus 400 of FIG. 4, apparatus 500 may include fourth inductive angular-position sensor 572 arranged at second side 554 of second portion 506. Fourth inductive angular-position sensor 572 may include a respective first sense coil 574, a respective second sense coil 576, and a respective oscillator coil 578 all arranged at second side 554 of second portion 506. Oscillator coil 578 of fourth inductive angular-position sensor 572 may carry a respective oscillating signal, which may generate a magnetic field. The magnetic field may induce a respective first sense signal 580 in first sense coil 574 and a respective second sense signal 582 in second sense coil 576, of fourth inductive angular-position sensor 572. First sense signal 580 and second sense signal 582 of fourth inductive angular-position sensor 572 may be affected by a portion of a target passing over, i.e., laterally adjacent, first sense coil 574, second sense coil 576, and/or oscillator coil 578 of fourth inductive angular-position sensor 572. A fourth integrated circuit 584 may receive first sense signal 580 and/or second sense signal 582 of fourth inductive angular-position sensor 572 and may determine an angular position of the target responsive to first sense signal 580 and/or second sense signal 582 of fourth inductive angular-position sensor 572. Fourth integrated circuit 584 may generate a fourth position signal 586 which may be indicative of the angular position of the target in relation to fourth inductive angular-position sensor 572. In some examples, one or more of first integrated circuit 534, second integrated circuit 540, third integrated circuit 568, and fourth integrated circuit 584 may be provided as a single integrated circuit, or may be included in one or more common integrated circuit packages, without limitation.

There is no requirement that all of first inductive angular-position sensor 508, second inductive angular-position sensor 512, third inductive angular-position sensor 556 and fourth inductive angular-position sensor 572 be provided. Thus, in some examples, fourth inductive angular-position sensor 572 is not provided.

Figure 6:
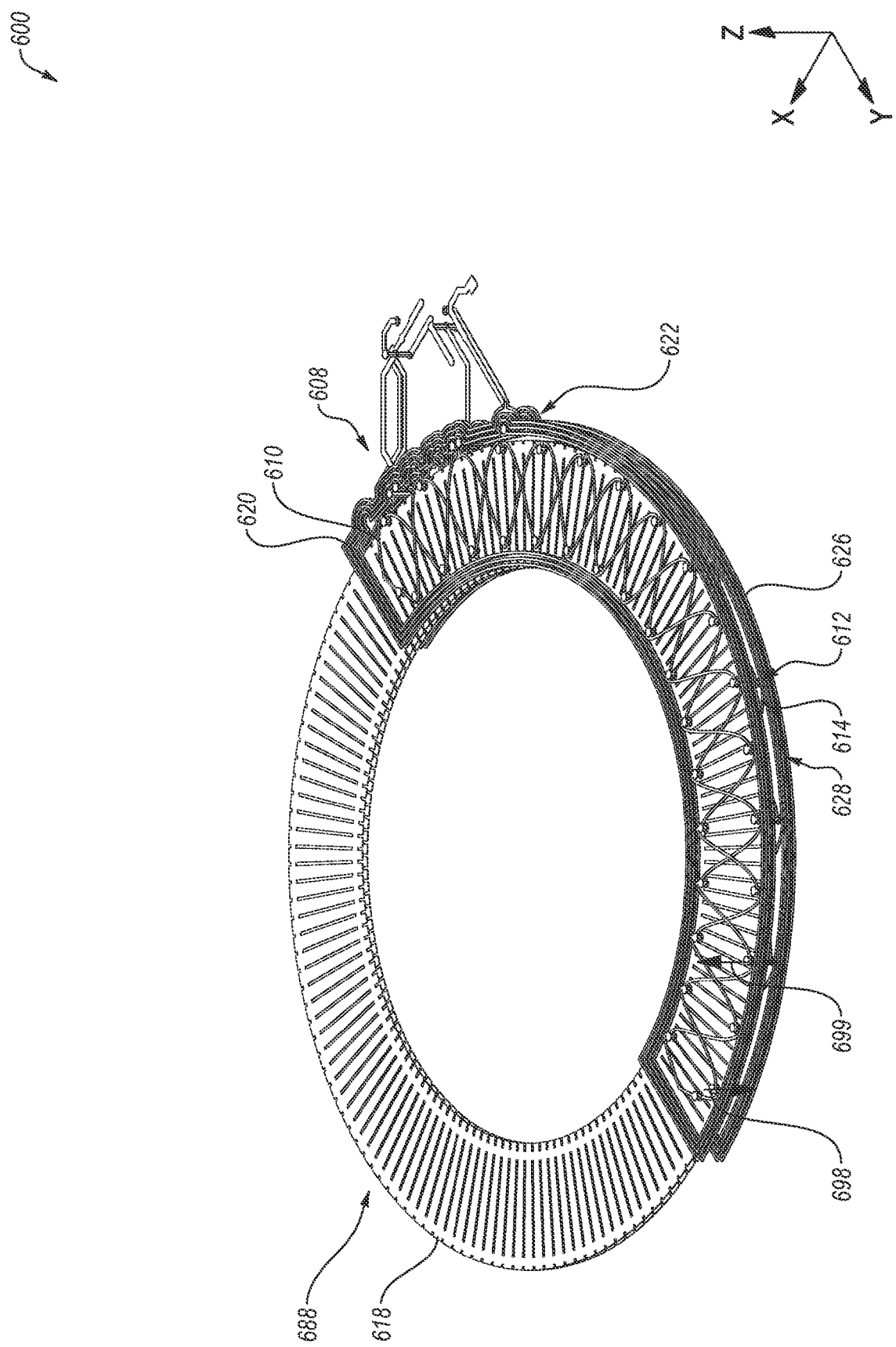
FIG. 6 is a perspective view of a layout of an apparatus according to one or more examples.

FIG. 6 is a perspective view of a layout of an apparatus 600 according to one or more examples. Apparatus 600 may include a shield 618 that may disrupt magnetic field between two or more inductive angular-position sensors (e.g., first inductive angular-position sensor 608 and second inductive angular-position sensor 612).

Apparatus 600 may include shield 618 positioned between a first sense coil 610 of first inductive angular-position sensor 608 and an oscillator coil 626 of second inductive angular-position sensor 612. Additionally shield 618 may be positioned between an oscillator coil 620 of first inductive angular-position sensor 608 and a first sense coil 614 of second inductive angular-position sensor 612. First sense coil 610 and oscillator coil 620 of first inductive angular-position sensor 608 may have an at-least-partially-annular shape 622. First sense coil 614 and oscillator coil 626 of second inductive angular-position sensor 612 may have an at-least-partially-annular shape 628. There is no requirement that the at-least-partially-annular shape 622 of first inductive angular-position sensor 608 be identical with the at-least-partially-annular shape 628 of second inductive angular-position sensor 612. Shield 618 may have a respective at-least-partially-annular shape 688. Shield 618 may disrupt magnetic field 698 between oscillator coil 620 of first inductive angular-position sensor 608 and first sense coil 614 of second inductive angular-position sensor 612. Additionally, shield 618 may disrupt magnetic field 699 between oscillator coil 626 of second inductive angular-position sensor 612 and first sense coil 610 of first inductive angular-position sensor 608.

Figure 7:
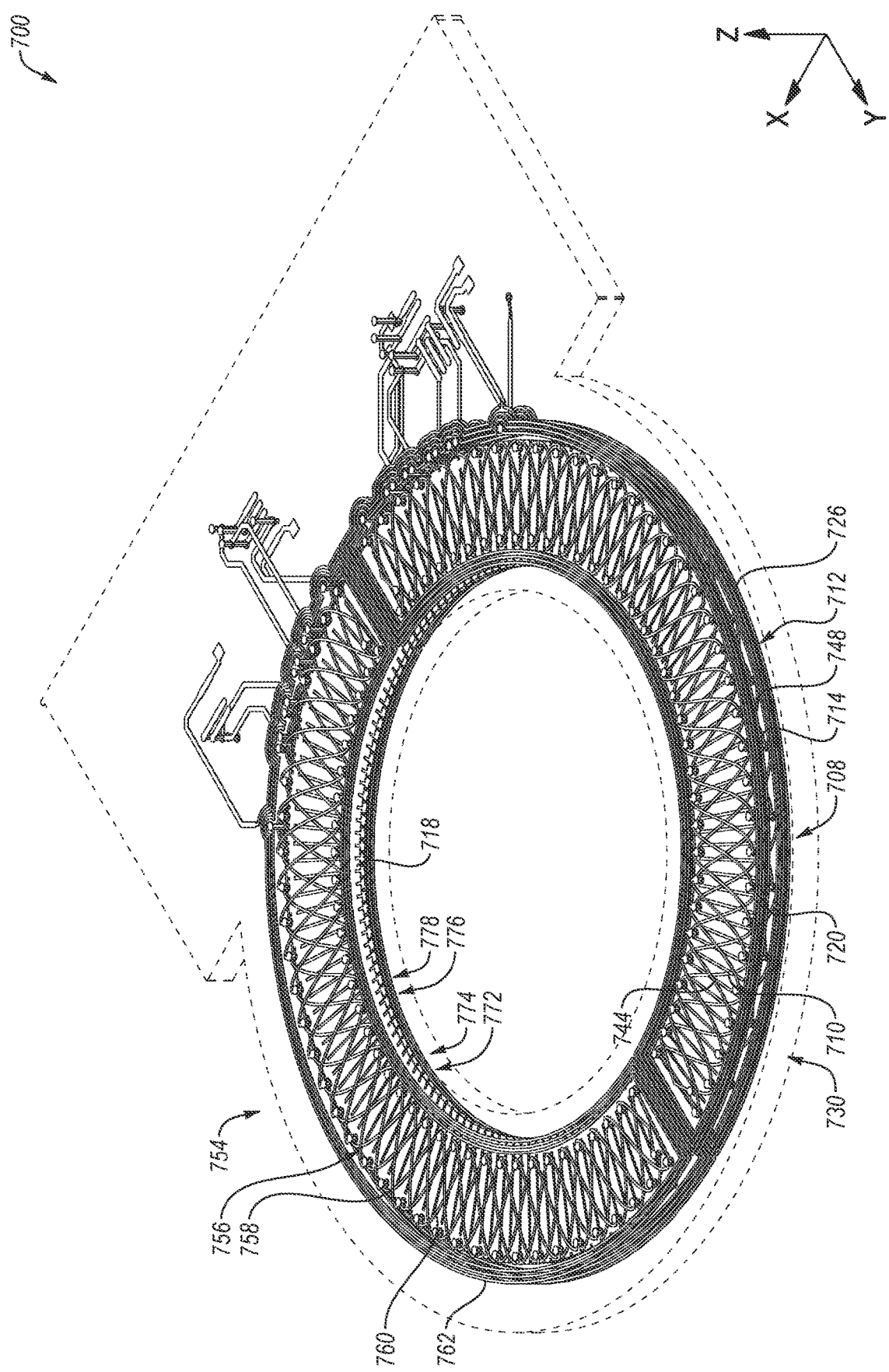
FIG. 7 is a perspective view of a layout of an apparatus according to one or more examples.

FIG. 7 is a perspective view of a layout of an apparatus 700 according to one or more examples. Apparatus 700 may include elements of more than two inductive angular-position sensors (e.g., first inductive angular-position sensor 708, second inductive angular-position sensor 712, third inductive angular-position sensor 756, and/or fourth inductive angular-position sensor 772). Each of the more than two inductive angular-position sensors may independently provide sense signals (not illustrated in FIG. 7) indicative of an angular position of a target (not illustrated in FIG. 7) relative to the inductive angular-position sensors.

Apparatus 700 may include a first inductive angular-position sensor 708 including a respective first sense coil 710, a respective second sense coil 744, and a respective oscillator coil 720. Apparatus 700 may include a second inductive angular-position sensor 712 including a respective first sense coil 714, a respective second sense coil 748, and a respective oscillator coil 726. Apparatus 700 may include a third inductive angular-position sensor 756 including a respective first sense coil 758, a respective second sense coil 760, and a respective oscillator coil 762. Apparatus 700 may include a fourth inductive angular-position sensor 772 including a respective first sense coil 774, a respective second sense coil 776, and a respective oscillator coil 778. Fourth inductive angular-position sensor 772 including respective first sense coil 774, second sense coil 776, and oscillator coil 778 may not be visible in FIG. 7 because the view of them may be obstructed by shield 718.

Apparatus 700 may include a shield 718. Shield 718 may be between first inductive angular-position sensor 708 and second inductive angular-position sensor 712. Thus, shield 718 may disrupt magnetic field coupling between oscillator coil 726 of second inductive angular-position sensor 712 and one or both of first sense coil 710 and second sense coil 744 of first inductive angular-position sensor 708. Further, shield 718 may disrupt magnetic field coupling between oscillator coil 720 of first inductive angular-position sensor 708 and one or both of first sense coil 714 and second sense coil 748 of second inductive angular-position sensor 712. Shield 718 may be also be between third inductive angular-position sensor 756 and fourth inductive angular-position sensor 772. Thus, shield 718 may disrupt magnetic field coupling between oscillator coil 778 of fourth inductive angular-position sensor 772 and one or both of first sense coil 758 and second sense coil 760 of third inductive angular-position sensor 756. Further, shield 718 may disrupt magnetic field between oscillator coil 762 of third inductive angular-position sensor 756 and one or both of first sense coil 774 and second sense coil 776 of fourth inductive angular-position sensor 772.

Figure 8:
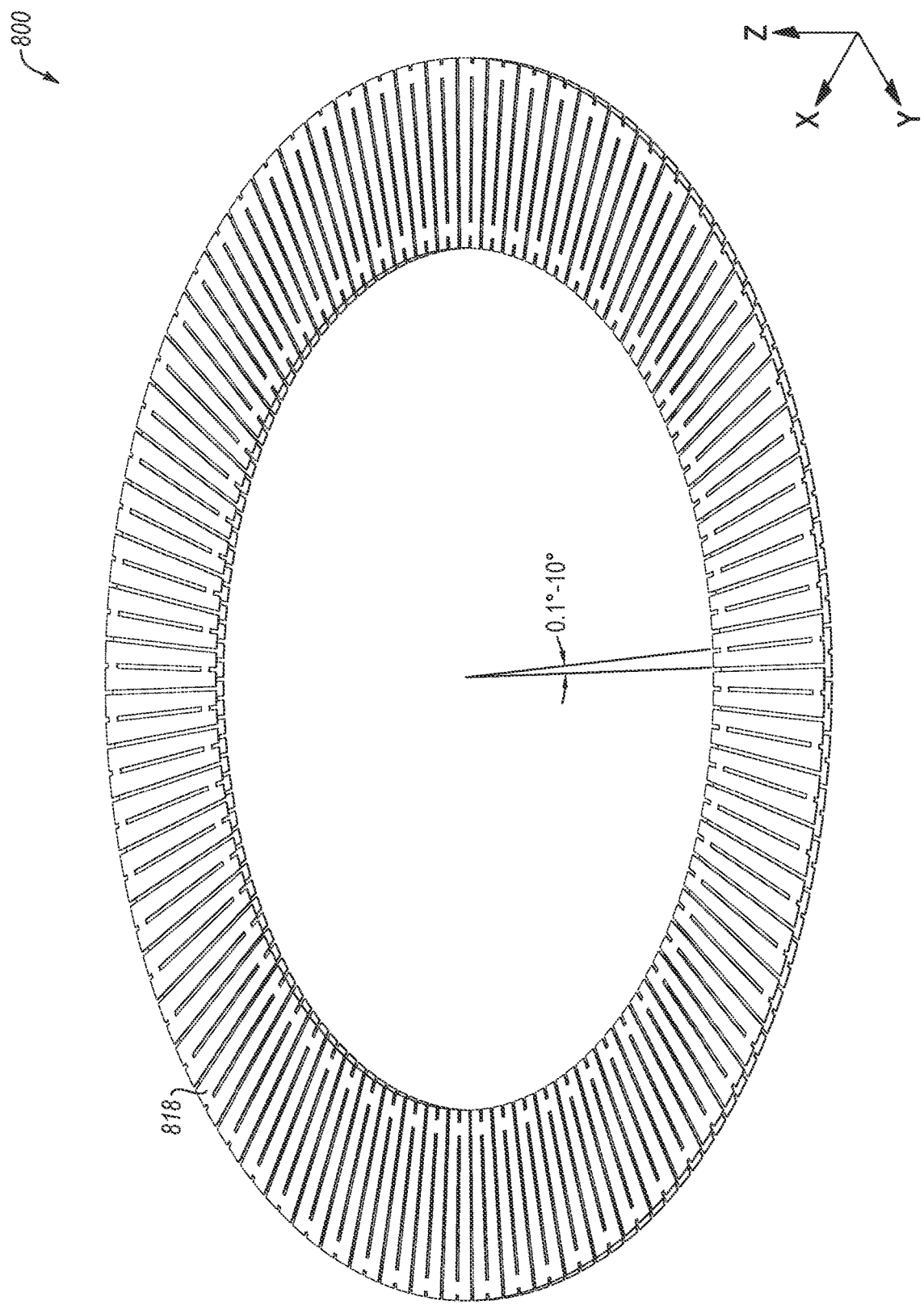
FIG. 8 is a perspective view of a layout of a shield according to one or more examples.

FIG. 8 is a perspective view of a layout of a shield 818 according to one or more examples. Shield 818 that may disrupt magnetic field coupling, i.e., interference, between two or more inductive angular-position sensors (not illustrated in FIG. 8).

As a non-limiting example, shield 818 may be to be positioned between a first sense coil (not illustrated in FIG. 8) of first inductive angular-position sensor (not illustrated in FIG. 8) and an oscillator coil (not illustrated in FIG. 8) of second inductive angular-position sensor (not illustrated in FIG. 8). Additionally shield 818 may be to be positioned between an oscillator coil (not illustrated in FIG. 8) of the first inductive angular-position sensor and a first sense coil (not illustrated in FIG. 8) of the second inductive angular-position sensor. The respective first sense coils and the respective oscillator coils may have an at-least-partially-annular shape. Shield 818 may have a respective at-least-partially-annular shape. Shield 818 may disrupt magnetic field (not illustrated in FIG. 8) between the respective oscillator coils and the respective first sense coils.

Figure 9:
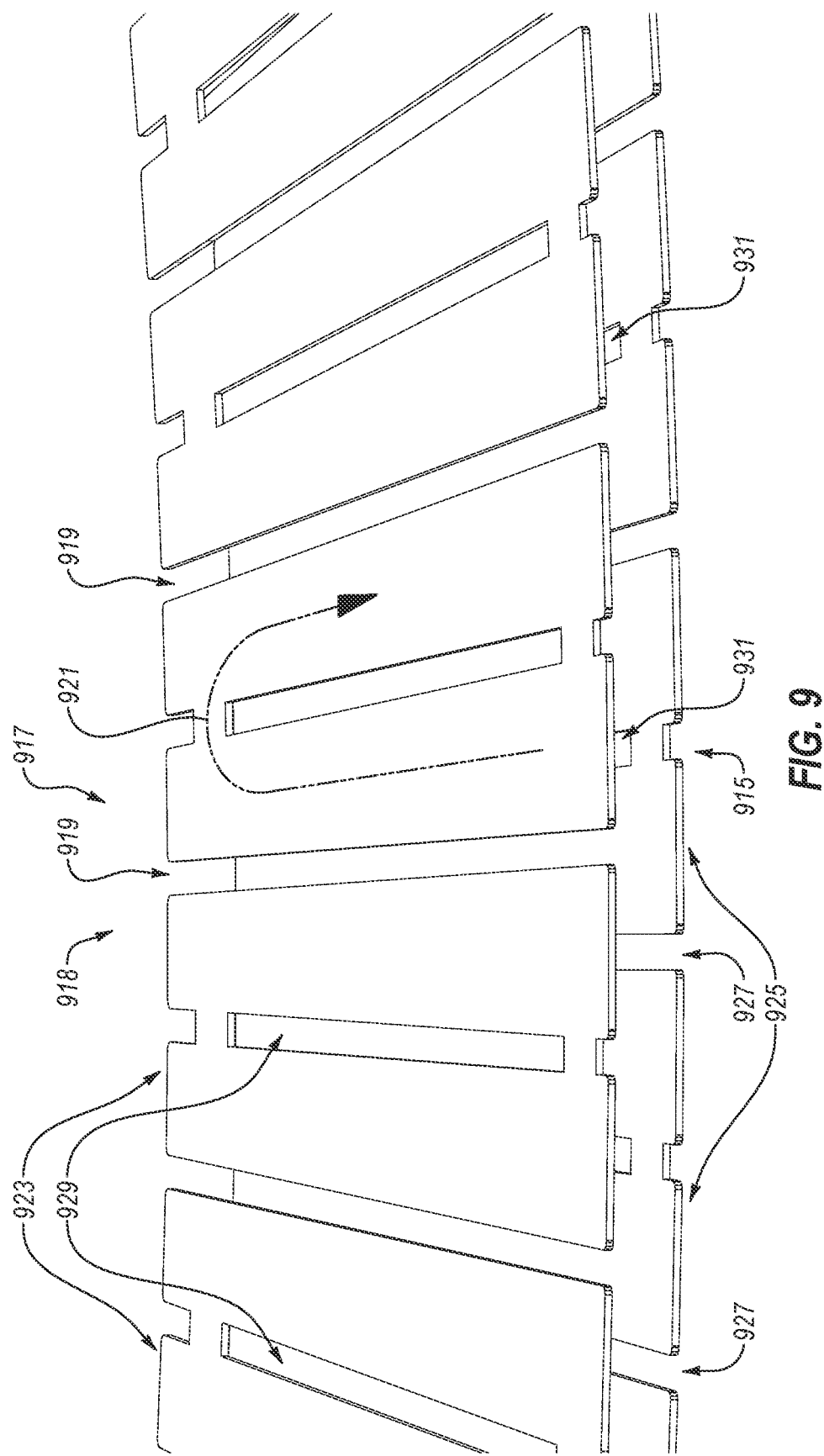
FIG. 9 is a close-up perspective view of a layout of a portion of a shield according to one or more examples.

FIG. 9 is a close-up perspective view of a layout of a portion of a shield 918 according to one or more examples. Shield 918 that may disrupt magnetic field between two or more inductive angular-position sensors (not illustrated in FIG. 9).

Shield 918 may include a first shield portion 917. First shield portion 917 may include first shield segments 923, which first shield segments 923 may define first gaps 919 between first shield segments 923 and first voids 929, e.g., one of first voids 929 in each of first shield segments 923. Each of first shield segments 923 may define a respective path 921 for electrical current, e.g., a path for an eddy current.

Shield 918 may include a second shield portion 915. As a non-limiting example, shield 918 may be made up of two separate shield portions in two separate planes. As a non-limiting example, shield 918 may be made up of conductive lines in two separate layers of a PCB. Second shield portion 915 may include second shield segments 925, which second shield segments 925 may define second gaps 927 between second shield segments 925 and second voids 931, e.g., one of second voids 931 in each of second shield segments 925. Each of second shield segments 925 may define a respective path (not illustrated in FIG. 9) for electrical current, e.g., a path for an eddy current.

As an example of eddy currents being induced in shield 918, an oscillator coil above or below shield 918 may generate a magnetic field which may pass through shield 918. The magnetic field passing through shield 918 may induce eddy currents in paths 921 of first shield segments 923 and/or in the paths of second shield segments 925. By including paths 921 (and the paths of second shield segments 925) for eddy currents, shield 918 may more effectively disrupt magnetic field that would otherwise induce currents in sense coils on an opposite side of shield 918 from the oscillator coil.

Each of first gaps 919 may extend in a radial direction. Each of the first gaps 919 may be angularly spaced from others of the first gaps 919. The first gaps 919 may be angularly spaced by between 0.1° and 10°, as shown in FIG. 8.

In some examples, none of first gaps 919 may be aligned with any of second gaps 927. Further, in some examples, none of the first gaps 919 and the first voids 929 may be aligned with any of the second gaps 927 and the second voids 931. In other words, each of the first gaps 919 and each of the first voids 929 may be over a respective one of the second shield segments 925. Further, each of the second gaps 927 and each of the second voids 931 may be under a respective one of the first shield segments 923.

Figure 10B:
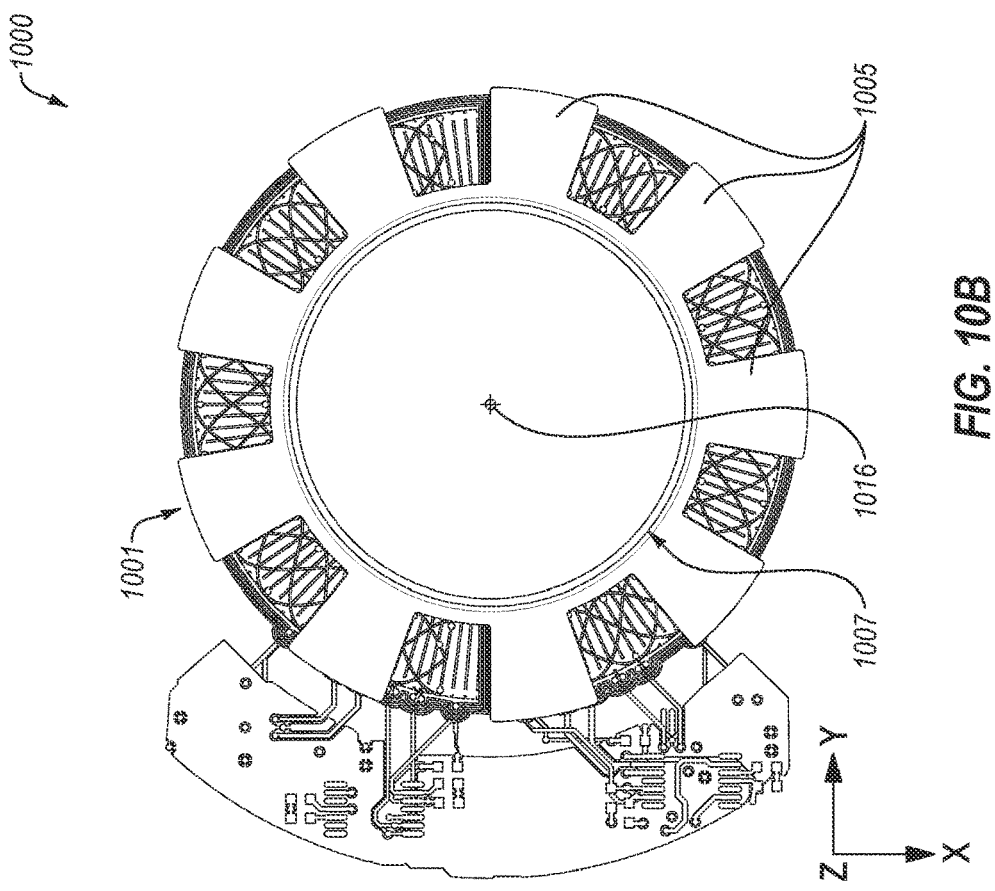
FIG. 10B is a bottom view of a layout the apparatus of FIG. 10A according to one or more examples.
Figure 10A:
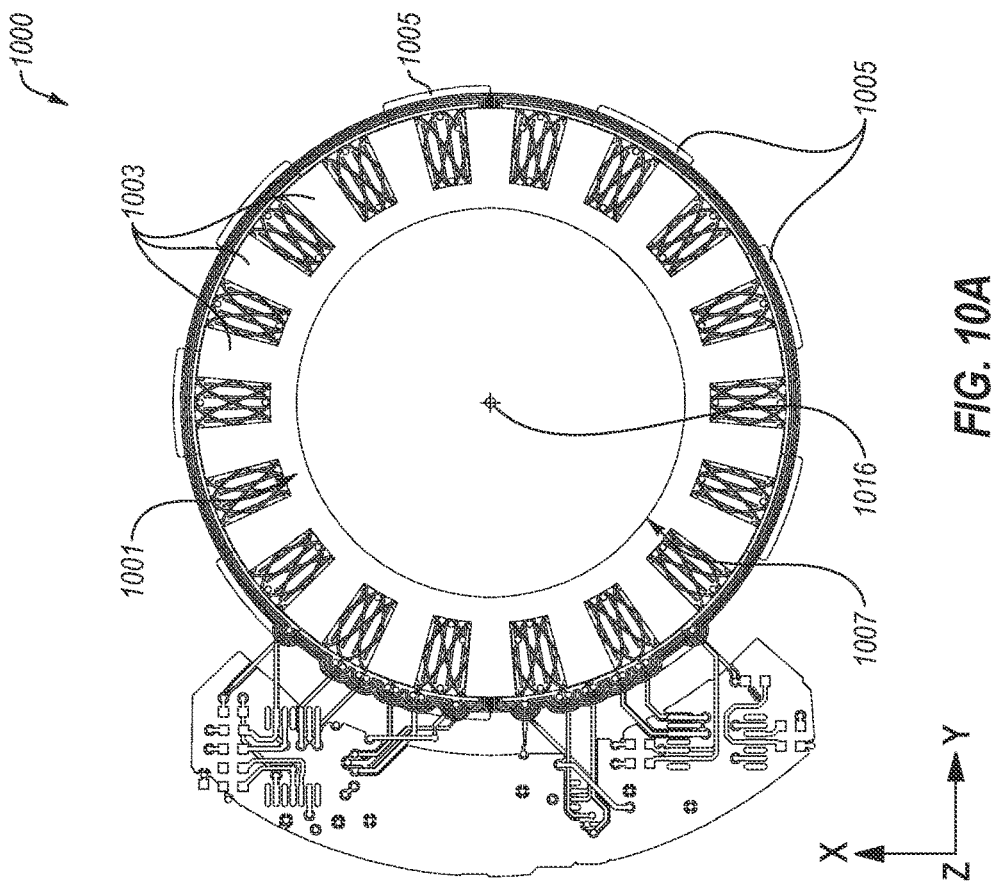
FIG. 10A is a top view of a layout of an apparatus according to one or more examples.
Figure 10C:
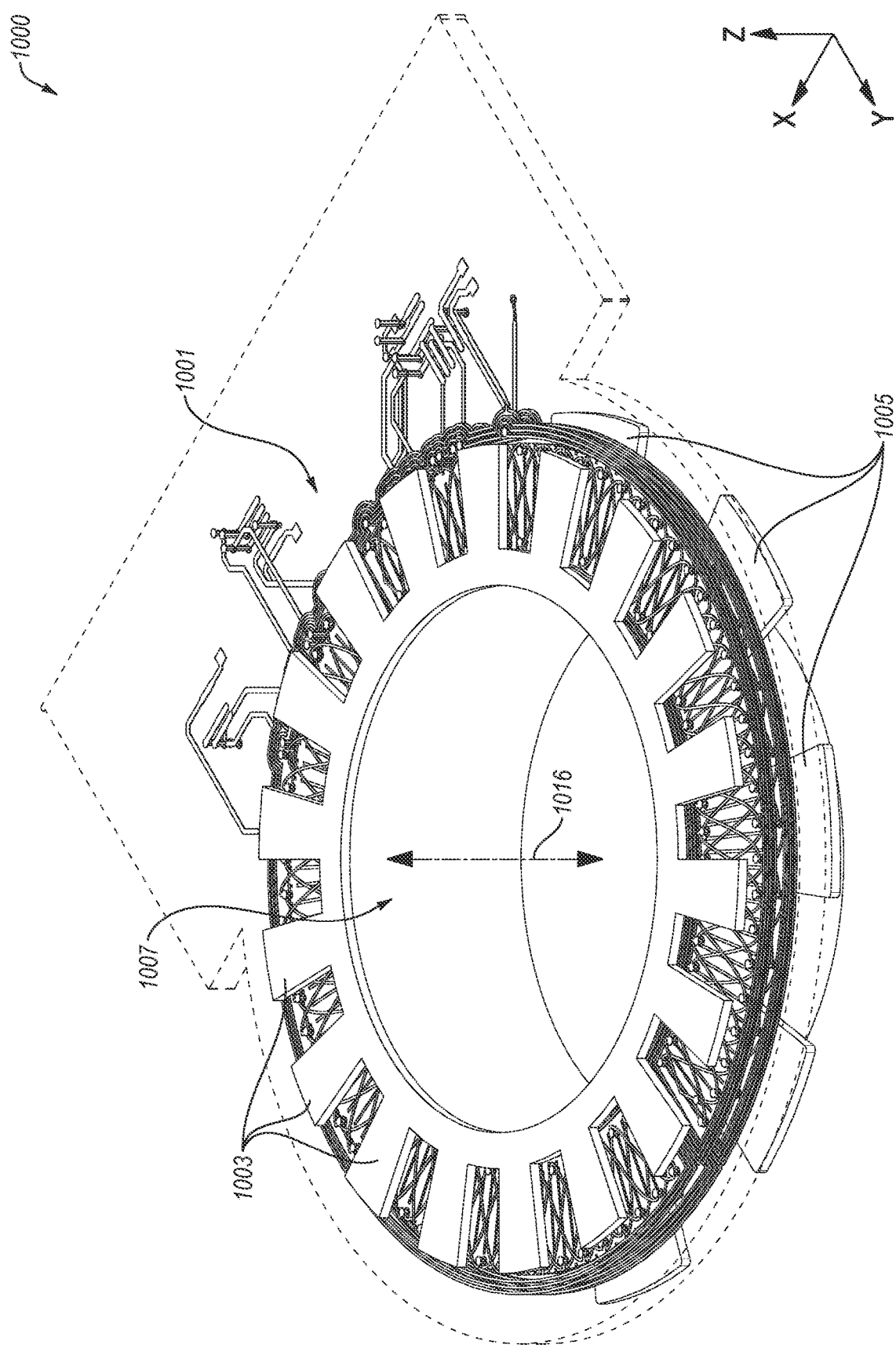
FIG. 10C is a perspective view of a layout the apparatus of FIG. 10A and FIG. 10B according to one or more examples.

FIG. 10A is a top view of a layout of an apparatus 1000 according to one or more examples. FIG. 10B is a bottom view of a layout of apparatus 1000 according to one or more examples. FIG. 10C is a perspective view of a layout of apparatus 1000 according to one or more examples. Apparatus 1000 may include a target 1001. Target 1001 may be used with one or more inductive angular-position sensors to cause the respective inductive angular-position sensors to generate sense signals indicative of an angular position of target 1001.

Target 1001 may include a first number of fins 1003 (which first number of fins may be referred to herein as "fins 1003"). Fins 1003 may be arranged at a first portion (e.g., a top portion) of target 1001. Target 1001 may include a second number of fins 1005 (which second number of fins may be referred to herein as "fins 1005"). Fins 1005 may be arranged at a second portion (e.g., bottom portion) of target 1001. Target 1001 may include a connector portion 1007 connecting fins 1003 to fins 1005. Connector portion 1007 may be fit within a hole defined by a support structure of an apparatus according to one or more examples of the present disclosure. As a non-limiting example, connector portion 1007 may be to be within an inner radius (e.g., inner radius 496 of FIG. 4) of an annulus (e.g., annulus 494 of FIG. 4) defined by the support structure.

Fins 1003 and fins 1005 may be angularly spaced around an axis 1016 (e.g., an axis 1016 of rotation of target 1001), coupled to connector portion 1007 by a respective annulus, and proceed radially from the respective annulus. The angular size of fins 1003 and fins 1005 (and of gaps between fins 1003 and of gaps between fins 1005) may be related to the frequency of repeating portions of sense coils laterally adjacent to, i.e., to be under, fins 1003 and the frequency of repeating portions of sense coils laterally adjacent to, i.e., to be above fins 1005. As a non-limiting example, each of fins 1003 (and the gaps therebetween) may be sized to disrupt a fraction of a period of a sinusoidal wave of one or more sense coils under it, e.g., a respective first sense coil of a respective second inductive angular-position sensor, each of fins 1005 (and the gaps therebetween) may be sized to disrupt a fraction of a period of a sinusoidal wave of one or more sense coils above it e.g., a respective first sense coil of a respective first inductive angular-position sensor.

In disrupting magnetic fields, fins 1003 and fins 1005 may affect sense signals generated by the sense coils respectively under fins 1003 and above fins 1005. Responsive to one or more affected sense signals, an integrated circuit may determine an angular position of target 1001.

Target 1001 may rotate around axis 1016. As target 1001 rotates around axis 1016, fins 1003 and fins 1005 may affect the sense signals of sense coils under and above them, respectively, such that the integrated circuit may continually track the angular position of target 1001.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used in the present disclosure, the terms "module" or "component" may refer to specific hardware implementations may perform the actions of the module or component and/or software objects or software routines that may be stored on and/or executed by general purpose hardware (e.g., computer-readable media, processing devices, without limitation) of the computing system. In various examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," without limitation).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, without limitation" or "one or more of A, B, and C, without limitation." is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure may include:

Example 1: An apparatus comprising: a support structure; a first inductive angular-position sensor comprising a respective first sense coil arranged at a first portion of the support structure, the first sense coil of the first inductive angular-position sensor at least partially circumscribing an axis; a second inductive angular-position sensor comprising a respective first sense coil arranged opposite the first sense coil of the first inductive angular-position sensor at a second portion of the support structure, the first sense coil of the second inductive angular-position sensor at least partially circumscribing the axis; and a shield arranged between the first sense coil of the first inductive angular-position sensor and the first sense coil of the second inductive angular-position sensor.

Example 2: The apparatus according to Example 1, wherein the first inductive angular-position sensor to generate a first sense signal of the first inductive angular-position sensor independent of the second inductive angular-position sensor and wherein the second inductive angular-position sensor to generate a first sense signal of the second inductive angular-position sensor independent of the first inductive angular-position sensor.

Example 3: The apparatus according to any of Examples 1 and 2, wherein the second inductive angular-position sensor provides redundancy for the first inductive angular-position sensor in the apparatus.

Example 4: The apparatus according to any of Examples 1 through 3, comprising a target to rotate around the axis, the target comprising a first number of fins arranged to extend in proximity to the first sense coil of the first inductive angular-position sensor and a second number of fins arranged to extend in proximity to the first sense coil of the second inductive angular-position sensor.

Example 5: The apparatus according to any of Examples 1 through 4, wherein the target defines a connector portion between the first number of fins and the second number of fins.

Example 6: The apparatus according to any of Examples 1 through 5, wherein the support structure defines an annulus and the connector portion of the target is within an inner radius of the annulus.

Example 7: The apparatus according to any of Examples 1 through 6, wherein the first inductive angular-position sensor comprises a respective oscillator coil arranged at the first portion of the support structure, the oscillator coil of the first inductive angular-position sensor defining a respective at-least-partially-annular shaped path for electrical current, the at-least-partially-annular shaped path of the first inductive angular-position sensor at least partially circumscribing the axis, wherein the first sense coil of the first inductive angular-position sensor defines a respective substantially-sinusoidal-wave-shaped path for electrical current of the first inductive angular-position sensor, the substantially-sinusoidal-wave-shaped path of the first inductive angular-position sensor arranged substantially within the at-least-partially-annular shaped path of the first inductive angular-position sensor, wherein the second inductive angular-position sensor comprises a respective oscillator coil arranged at the second portion of the support structure, the second oscillator coil defining a respective at-least-partially-annular shaped path for electrical current, the at-least-partially-annular shaped path of the second inductive angular-position sensor at least partially circumscribing the axis, and wherein the first sense coil of the second inductive angular-position sensor defines a respective substantially-sinusoidal-wave-shaped path for electrical current of the second inductive angular-position sensor, the substantially-sinusoidal-wave-shaped path of the second inductive angular-position sensor arranged substantially within the at-least-partially-annular shaped path of the second inductive angular-position sensor.

Example 8: The apparatus according to any of Examples 1 through 7, wherein the first inductive angular-position sensor comprises a first integrated circuit to output a first position signal at least partially responsive to rotation of a target around the axis and wherein the second inductive angular-position sensor comprises a second integrated circuit to output a second position signal at least partially responsive to rotation of the target around the axis.

Example 9: The apparatus according to any of Examples 1 through 8, wherein the first inductive angular-position sensor is arranged at a first side of the support structure, wherein the second inductive angular-position sensor is arranged at the first side of the support structure, wherein the apparatus comprises: a third inductive angular-position sensor comprising a respective first sense coil arranged at a second side of the first portion of the support structure, the first sense coil of the third inductive angular-position sensor at least partially circumscribing the axis; and a fourth inductive angular-position sensor comprising a respective first sense coil arranged opposite the first sense coil of the third inductive angular-position sensor at the second side of the second portion of the support structure, the first sense coil of the fourth inductive angular-position sensor at least partially circumscribing the axis; and wherein the shield is arranged between the first sense coil of the third inductive angular-position sensor and the first sense coil of the fourth inductive angular-position sensor.

Example 10: An apparatus comprising: a shield to be positioned between a first sense coil of a first inductive angular-position sensor and an oscillator coil of a second inductive angular-position sensor, the first sense coil and an oscillator coil of the first inductive angular-position sensor having a first at-least-partially-annular shape, a first sense coil and the oscillator coil of the second inductive angular-position sensor having a second at-least-partially-annular shape, the shield having a third at-least-partially-annular shape, the shield to disrupt magnetic field coupling between the oscillator coil of the first inductive angular-position sensor and the first sense coil of the second inductive angular-position sensor.

Example 11: The apparatus according to Example 10, wherein the shield defines gaps, each of the gaps extending in a radial direction and each of the gaps angularly spaced from others of the gaps.

Example 12: The apparatus according to any of Examples 10 and 11, wherein the gaps are angularly spaced by between 0.1° and 10°.

Example 13: The apparatus according to any of Examples 10 through 12, wherein portions of the shield between the gaps defines paths for eddy currents induced in the shield.

Example 14: The apparatus according to any of Examples 10 through 13, wherein the shield comprises a first shield defining first gaps and a second shield defining second gaps, wherein none of the first gaps are aligned with any of the second gaps.

Example 15: The apparatus according to any of Examples 10 through 14, wherein the shield has an annular shape and is between a first sense coil of a third inductive angular-position sensor and an oscillator coil of a fourth inductive angular-position sensor.

Example 16: An apparatus comprising: a support structure; a first inductive angular-position sensor comprising: a respective oscillator coil defining a respective path for electrical current of the first inductive angular-position sensor, the oscillator coil of the first inductive angular-position sensor arranged at a first side of the support structure; and a respective first sense coil arranged substantially within the path for electrical current of the first inductive angular-position sensor; and a second inductive angular-position sensor comprising: a respective oscillator coil defining a respective path for electrical current of the second inductive angular-position sensor, the oscillator coil of the second inductive angular-position sensor arranged at a second side of the support structure opposing the first side of the support structure; and a respective first sense coil arranged substantially within the path for electrical current of the second inductive angular-position sensor.

Example 17: The apparatus according to Example 16, wherein the oscillator coil of the first inductive angular-position sensor and the first sense coil of the first inductive angular-position sensor are electrically isolated from the second oscillator coil of the second inductive angular-position sensor and the first sense coil of the second inductive angular-position sensor.

Example 18: The apparatus according to any of Examples 16 and 17, wherein the second inductive angular-position sensor provides redundancy for the first inductive angular-position sensor in the apparatus.

Example 19: The apparatus according to any of Examples 16 through 18, comprising a target to rotate relative to the first sense coil of the first inductive angular-position sensor and the first sense coil of the second inductive angular-position sensor the target comprising a first number of fins arranged to extend proximate to the first sense coil of the first inductive angular-position sensor and a second number of fins arranged to extend proximate to the first sense coil of the second inductive angular-position sensor.

Example 20: The apparatus according to any of Examples 16 through 19, wherein the oscillator coil of the first inductive angular-position sensor defines a generally semi-annular shape, wherein the first sense coil of the first inductive angular-position sensor defines a respective substantially-sinusoidal-wave-shape, wherein the oscillator coil of the second inductive angular-position sensor defines a generally semiannular shape, wherein the first sense coil of the second inductive angular-position sensor defines a respective substantially-sinusoidal-wave-shape, and wherein the support structure defines an annulus, wherein the first inductive angular-position sensor is arranged at a first side of the annulus, and wherein the second inductive angular-position sensor is arranged on a second side of the annulus, the second side opposing the first side.

Example 21: The apparatus according to any of Examples 16 through 20, wherein the first inductive angular-position sensor comprises a first integrated circuit to output a first position signal at least partially responsive to rotation of a target relative to the first sense coil of the first inductive angular-position sensor and wherein the second inductive angular-position sensor comprises a second integrated circuit to output a second position signal at least partially responsive to rotation of the target relative to the first sense coil of the second inductive angular-position sensor.

Example 22: The apparatus according to any of Examples 16 through 21, wherein the oscillator coil of the first inductive angular-position sensor and the first sense coil of the first inductive angular-position sensor are arranged at a first portion of the support structure, wherein the oscillator coil of the second inductive angular-position sensor and the first sense coil the second inductive angular-position sensor are arranged at the first portion of the support structure, wherein the apparatus comprises: a third inductive angular-position sensor comprising: a respective oscillator coil arranged opposite the oscillator coil of the first inductive angular-position sensor at the first side and at a second portion of the support structure; and a respective first sense coil arranged relative to the respective oscillator coil; a fourth inductive angular-position sensor comprising: a respective oscillator coil arranged opposite the respective oscillator coil of the second inductive angular-position sensor at the second side and at the second portion of the support structure; and a respective first sense coil arranged relative to the respective oscillator coil the fourth inductive angular-position sensor; and a shield arranged between the first sense coil of the first inductive angular-position sensor and the first sense coil of the second inductive angular-position sensor and between the first sense coil of the third inductive angular-position sensor and the first sense coil of the fourth inductive angular-position sensor.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus comprising:
   a support structure having a first side defining a first plane of the support structure and a second side defining a second plane of the support structure, the first side opposite the second side;
   a first inductive angular-position sensor comprising a first sense coil arranged at the first side of the support structure, the first sense coil of the first inductive angular-position sensor at least partially circumscribing an axis;
   a second inductive angular-position sensor comprising a second sense coil arranged opposite the first sense coil of the first inductive angular-position sensor at the second side of the support structure, the second sense coil of the second inductive angular-position sensor at least partially circumscribing the axis; and
   a shield arranged between the first sense coil of the first inductive angular-position sensor and the second sense coil of the second inductive angular-position sensor.

2. The apparatus of claim 1, wherein the first inductive angular-position sensor to generate a first sense signal of the first inductive angular-position sensor independent of the second inductive angular-position sensor and wherein the second inductive angular-position sensor to generate a first sense signal of the second inductive angular-position sensor independent of the first inductive angular-position sensor.

3. The apparatus of claim 1, wherein the second inductive angular-position sensor provides redundancy for the first inductive angular-position sensor in the apparatus.

4. The apparatus of claim 1, comprising a target to rotate around the axis, the target comprising a first number of fins arranged to extend in proximity to the first sense coil of the first inductive angular-position sensor and a second number of fins arranged to extend in proximity to the second sense coil of the second inductive angular-position sensor.

5. The apparatus of claim 4, wherein the target defines a connector portion between the first number of fins and the second number of fins.

6. The apparatus of claim 5, wherein the support structure defines an annulus and the connector portion of the target is within an inner radius of the annulus.

7. The apparatus of claim 1,
   wherein the first inductive angular-position sensor comprises a first oscillator coil arranged at the first side of the support structure, the first oscillator coil of the first inductive angular-position sensor defining a respective at-least-partially-annular shaped path for electrical current, the at-least-partially-annular shaped path of the first inductive angular-position sensor at least partially circumscribing the axis,
   wherein the first sense coil of the first inductive angular-position sensor defines a respective substantially-sinusoidal-wave-shaped path for electrical current of the first inductive angular-position sensor, the substantially-sinusoidal-wave-shaped path of the first inductive angular-position sensor arranged substantially within the at-least-partially-annular shaped path of the first inductive angular-position sensor,
   wherein the second inductive angular-position sensor comprises a second oscillator coil arranged at the second side of the support structure, the second oscillator coil defining a respective at-least-partially-annular shaped path for electrical current, the at-least-partially-annular shaped path of the second inductive angular-position sensor at least partially circumscribing the axis, and
   wherein the second sense coil of the second inductive angular-position sensor defines a respective substantially-sinusoidal-wave-shaped path for electrical current of the second inductive angular-position sensor, the substantially-sinusoidal-wave-shaped path of the second inductive angular-position sensor arranged substantially within the at-least-partially-annular shaped path of the second inductive angular-position sensor.

8. The apparatus of claim 1, wherein the first inductive angular-position sensor comprises a first integrated circuit to output a first position signal at least partially responsive to rotation of a target around the axis and wherein the second inductive angular-position sensor comprises a second integrated circuit to output a second position signal at least partially responsive to rotation of the target around the axis.

9. The apparatus of claim 1,
wherein the first inductive angular-position sensor is arranged at a first portion of the support structure,
wherein the second inductive angular-position sensor is arranged at the first portion of the support structure,
wherein the apparatus comprises:
a third inductive angular-position sensor comprising a third sense coil arranged at a second portion of the first portion of the support structure, the third sense coil of the third inductive angular-position sensor at least partially circumscribing the axis; and
a fourth inductive angular-position sensor comprising a fourth sense coil arranged opposite the third sense coil of the third inductive angular-position sensor at the second portion of the second portion of the support structure, the fourth sense coil of the fourth inductive angular-position sensor at least partially circumscribing the axis; and
wherein the shield is arranged between the third sense coil of the third inductive angular-position sensor and the fourth sense coil of the fourth inductive angular-position sensor.

10. An apparatus comprising:
a shield to be positioned between a first sense coil of a first inductive angular-position sensor and a second oscillator coil of a second inductive angular-position sensor, the first sense coil and a first oscillator coil of the first inductive angular-position sensor having a first at-least-partially-annular shape to be arranged at a first side of the shield, a second sense coil and the second oscillator coil of the second inductive angular-position sensor having a second at-least-partially-annular shape to be arranged at a second side of the shield opposite the first side, the shield having a third at-least-partially-annular shape, the shield to disrupt magnetic field coupling between the first oscillator coil of the first inductive angular-position sensor and the second sense coil of the second inductive angular-position sensor.

11. The apparatus of claim 10, wherein the shield defines gaps, each of the gaps extending in a radial direction and each of the gaps angularly spaced from others of the gaps.

12. The apparatus of claim 11, wherein the gaps are angularly spaced by between 0.1° and 10°.

13. The apparatus of claim 11, wherein portions of the shield between the gaps defines paths for eddy currents induced in the shield.

14. The apparatus of claim 10, wherein the shield comprises a first shield defining first gaps and a second shield defining second gaps, wherein none of the first gaps are aligned with any of the second gaps.

15. The apparatus of claim 10, wherein the shield has an annular shape and is between a third sense coil of a third inductive angular-position sensor and a fourth oscillator coil of a fourth inductive angular-position sensor.

16. An apparatus comprising:
a support structure having a first side defining a first plane of the support structure and a second side defining a second plane of the support structure, the first side opposite the second side;
a first inductive angular-position sensor comprising:
a first oscillator coil defining a respective path for electrical current of the first inductive angular-position sensor, the first oscillator coil of the first inductive angular-position sensor arranged at the first side of the support structure; and
a first sense coil arranged substantially within the path for electrical current of the first inductive angular-position sensor; and
a second inductive angular-position sensor comprising:
a second oscillator coil defining a respective path for electrical current of the second inductive angular-position sensor, the second oscillator coil of the second inductive angular-position sensor arranged at the second side of the support structure; and
a second sense coil arranged substantially within the path for electrical current of the second inductive angular-position sensor.

17. The apparatus of claim 16, wherein the first oscillator coil and the first sense coil of the first inductive angular-position sensor are electrically isolated from the second oscillator coil and the second sense coil of the second inductive angular-position sensor.

18. The apparatus of claim 16, wherein the second inductive angular-position sensor provides redundancy for the first inductive angular-position sensor in the apparatus.

19. The apparatus of claim 16, comprising a target to rotate relative to the first sense coil of the first inductive angular-position sensor and the second sense coil of the second inductive angular-position sensor, the target comprising a first number of fins arranged to extend proximate to the first sense coil of the first inductive angular-position sensor and a second number of fins arranged to extend proximate to the second sense coil of the second inductive angular-position sensor.

20. The apparatus of claim 16,
wherein the first oscillator coil of the first inductive angular-position sensor defines a generally semiannular shape,
wherein the first sense coil of the first inductive angular-position sensor defines a respective substantially-sinusoidal-wave-shape,
wherein the second oscillator coil of the second inductive angular-position sensor defines a generally semiannular shape,
wherein the second sense coil of the second inductive angular-position sensor defines a respective substantially-sinusoidal-wave-shape, and
wherein the support structure defines an annulus.

21. The apparatus of claim 16, wherein the first inductive angular-position sensor comprises a first integrated circuit to output a first position signal at least partially responsive to rotation of a target relative to the first sense coil of the first inductive angular-position sensor and wherein the second inductive angular-position sensor comprises a second integrated circuit to output a second position signal at least partially responsive to rotation of the target relative to the second sense coil of the second inductive angular-position sensor.

22. The apparatus of claim 16,
wherein the first oscillator coil and the first sense coil are arranged at the first side and at a first portion of the support structure,
wherein the second oscillator coil and the second sense coil are arranged at the second side and at the first portion of the support structure,
wherein the apparatus comprises:
a third inductive angular-position sensor comprising:
a third oscillator coil arranged opposite the first oscillator coil at the first side and at a second portion of the support structure; and
a third sense coil arranged relative to the third oscillator coil;

a fourth inductive angular-position sensor comprising:
  a fourth oscillator coil arranged opposite the second oscillator coil at the second side and at the second portion of the support structure; and
  a fourth sense coil arranged relative to the fourth oscillator coil; and
a shield arranged between the first sense coil and the second sense coil and between the third sense coil and the fourth sense coil.

23. The apparatus of claim 1, wherein the shield comprises conductive material in one or more layers of the support structure.

24. The apparatus of claim 1, wherein:
the first sense coil is supported at the first side of the support structure, and
the second sense coil is supported at the second side of the support structure.

25. The apparatus of claim 10, wherein:
the shield is to shield the first oscillator coil of the first inductive angular-position sensor from the second sense coil of the second inductive angular-position sensor.

* * * * *